United States Patent
Simpson et al.

(10) Patent No.: US 11,230,621 B2
(45) Date of Patent: Jan. 25, 2022

(54) CURABLE POLYMER LATEX COMPOSITIONS FOR THE MANUFACTURE OF RUBBER ARTICLES

(71) Applicant: Synthomer Sdn. Bhd., Kluang (MY)

(72) Inventors: Gareth Simpson, Cambridge (GB); Asrulrani Abd Rani, Pasir Gudang (MY); Thian Hong Ng, Parit Raja (MY)

(73) Assignee: Synthomer Sdn. Bhd

( * ) Notice: Subject to any disclaimer, the term of this patent is extended or adjusted under 35 U.S.C. 154(b) by 222 days.

(21) Appl. No.: 16/469,547

(22) PCT Filed: Dec. 15, 2016

(86) PCT No.: PCT/MY2016/000084
§ 371 (c)(1),
(2) Date: Jun. 13, 2019

(87) PCT Pub. No.: WO2018/111087
PCT Pub. Date: Jun. 21, 2018

(65) Prior Publication Data
US 2020/0062879 A1    Feb. 27, 2020

(51) Int. Cl.
| | | |
|---|---|---|
| C08F 236/12 | (2006.01) |
| B29C 41/14 | (2006.01) |
| C08F 2/22 | (2006.01) |
| C08F 2/38 | (2006.01) |
| C08K 3/06 | (2006.01) |
| C08K 5/38 | (2006.01) |
| C08K 5/40 | (2006.01) |
| C08F 8/34 | (2006.01) |
| C08K 3/22 | (2006.01) |

(52) U.S. Cl.
CPC ............ *C08F 236/12* (2013.01); *B29C 41/14* (2013.01); *C08F 2/22* (2013.01); *C08F 2/38* (2013.01); *C08K 3/06* (2013.01); *C08K 5/38* (2013.01); *C08K 5/40* (2013.01); *C08F 8/34* (2013.01); *C08K 3/22* (2013.01)

(58) Field of Classification Search
CPC .. C08F 236/12; C08F 2/22; C08F 2/38; B29C 41/14; C08K 3/22; C08K 5/38; C08K 3/06; C08K 5/40
USPC ....................................................... 524/201
See application file for complete search history.

(56) References Cited

U.S. PATENT DOCUMENTS

| | | | | |
|---|---|---|---|---|
| 2,375,042 A | * | 5/1945 | Semon .................. | C08K 5/39 524/202 |
| 2,376,350 A | * | 5/1945 | Fryling ................. | C08F 36/04 526/220 |
| 2,662,876 A | * | 12/1953 | Antlfinger ............... | C08F 4/28 526/83 |
| 2,959,821 A | * | 11/1960 | Kolb ...................... | B29C 41/14 264/306 |
| 5,750,618 A | | 5/1998 | Vogt | |
| 9,023,914 B2 | | 5/2015 | Barner-Kowollik et al. | |
| 2006/0052513 A1 | * | 3/2006 | Butz ....................... | C08L 53/02 524/555 |
| 2012/0149859 A1 | * | 6/2012 | Yang ....................... | B29C 41/14 526/209 |
| 2014/0235744 A1 | | 8/2014 | Barner-Kowollik et al. | |

FOREIGN PATENT DOCUMENTS

| | | |
|---|---|---|
| CA | 2078414 | 3/1993 |
| CN | 101014628 | 8/2007 |
| DE | 1301060 | 8/1969 |
| JP | 05202136 | 8/1993 |
| JP | 2013505308 | 2/2013 |
| JP | 2014521799 | 8/2014 |
| WO | 2016013666 | 1/2016 |

OTHER PUBLICATIONS

International Search Report and Written Opinion for Application No. PCT/MY2016/000084 dated Sep. 14, 2017.
USPTO Non-Final Office Action for U.S. Appl. No. 16/469,547 dated Apr. 27, 2021.

* cited by examiner

*Primary Examiner* — Hui H Chin
(74) *Attorney, Agent, or Firm* — Tumey L.L.P.

(57) ABSTRACT

A curable polymer latex composition obtainable by:
(a) subjecting a monomer mixture comprising
   i. at least one conjugated diene;
   ii. at least one ethylenically unsaturated nitrile;
   iii. optionally at least one ethylenically unsaturated acid;
   iv. optionally at least one further ethylenically unsaturated compound different from any of the compounds (i)-(iii);
to free-radical emulsion polymerization in an aqueous reaction medium to form a raw polymer latex; and
(b) allowing the obtained raw latex to mature in the presence of at least one thiocarbonyl-functional compound, wherein the at least one thiocarbonyl-functional compound is present in an amount of at least 0.05 wt.-%, based on the total amount of monomers subjected to free-radical emulsion polymerization in step (a), and
(c) optionally compounding the matured polymer latex with one or more cross-linking agent. Methods for making such curable polymer latex composition or rubber articles made therefrom, respectively.

18 Claims, No Drawings

CURABLE POLYMER LATEX COMPOSITIONS FOR THE MANUFACTURE OF RUBBER ARTICLES

FIELD OF THE INVENTION

The present invention relates to certain synthetic polymer latices obtainable by free-radical emulsion polymerization, which are modified by maturing in the presence of a thiocarbonyl-functional compound and curable compositions comprising such matured polymer latex for the manufacture of rubber articles, particularly dip molded articles such as gloves. The present invention is also related to methods for making such curable polymer latex compositions or rubber articles, respectively. The use of such curable polymer latex compositions for the manufacture of dip molded articles or for coating and impregnating a substrate is likewise within the scope of the present invention. Furthermore the present invention relates to the use of thiocarbonyl-functional compounds as additives for enhancing the softness of rubber articles derivable from a curable polymer latex composition without degrading the tensile strength and/or elongation at break.

BACKGROUND OF THE INVENTION

The manufacture of thin film rubber articles such as gloves, condoms and catheters from natural rubber latex has been known for many years. Typically such articles are manufactured by a dip molding process which involves dipping, one or several times, a mold of the desired shape after suitable pre-treatment into a composition comprising natural rubber latex and cross-linking substances such as sulphur and vulcanization accelerators and/or polyvalent metal compounds, and subsequent drying to form a rubber film of the desired thickness. The formed rubber film is then cured at elevated temperature to impart elastic properties to the film and subsequently the rubber article is removed from the mold. While thin film rubber articles of adequate mechanical properties and barrier properties for most conventional applications can be made from natural rubber latex, natural rubber latex contains latex proteins, which may cause allergic reactions to sensitised individuals upon contact to the skin (type I hypersensitivity).

Synthetic polymer latices such as nitrile latex (NBR) or carboxylated nitrile latex (XNBR) do not contain proteins and have therefore become established as an alternative to natural rubber latex in the manufacture of rubber articles in order to improve skin compatibility. Synthetic polymer latices are typically made by free radical emulsion polymerization of the respective monomers in an aqueous reaction medium containing auxiliary agents such as an initiator, emulsifier and/or chain transfer agent. The manufacture of rubber articles from synthetic polymer latices is achieved analogously to the manufacture of rubber articles from natural rubber latex. Thus the synthetic polymer latex is typically compounded with one or more than one cross-linking additive to form a curable polymer latex composition from which a rubber article of the desired shape is formed e.g. by dip molding.

Enormous quantities of rubber articles manufactured from natural rubber latex and synthetic polymer latices such as gloves are produced and consumed worldwide. Accordingly there is thus a strong economic and ecological impetus to reduce the amount of raw materials required to prepare the rubber articles. A reduction of the film thickness of thin film rubber articles goes along with lowering the raw material consumption and thereby the production costs, and moreover reduces the amount of waste material to be disposed of. On the other hand there are stringent requirements to the physical properties determined by the type of rubber product and its application, which have to be met. Latex-made gloves should for instance be devoid of any disagreeable odour and exhibit good barrier properties, suitable mechanical properties with a high elongation at break and high tensile strength, good donning and comfortable wearing properties with adequate tactility, and an aesthetically pleasant non-staining visual appearance, wherein these properties should be stably preserved even upon long term storage. Reducing the film thickness generally requires the use of a polymer latex, which imparts a relatively high tensile strength, in order to withstand the mechanical stresses encountered upon use. A higher tensile strength is however normally associated with a higher stiffness and reduced softness of the material resulting in a less comfortable feel for the wearer and a reduced tactility, which is unsatisfactory. It would thus be desirable to provide a polymer latex that imparts an enhanced softness in combination with a suitably high tensile strength to latex films derived there from to facilitate producing optimized rubber articles of reduced film thickness. Such a desirable combination of mechanical properties should ideally be maintained under conditions, which the respective rubber product can be expected to encounter in a product life cycle including e.g. ageing over extended periods of time.

Elemental sulfur and other cross-linking agents have extensively been used as vulcanization agents and vulcanization accelerators to formulate polymer latex compositions with desired curing characteristics for the manufacture of rubber articles. For this purpose the formed raw polymer latex is conventionally compounded without any preceding modification with sulfur and/or other vulcanization agents for vulcanization of the latex. Articles of the desired shape are then formed from the compounded polymer latex composition and subsequently cured by a heat treatment at temperatures typically in the range of 100° C. to 250° C.

Thiocarbonyl-functional compounds including thiuram compounds have previously been used as auxiliary agents in the preparation of polymer latices by emulsion polymerization. Thus for example U.S. Pat. No. 2,662,876 discloses a combination of a compound selected from sulphur and sulphur donors including inter alia thiuram sulfide compounds with a water-soluble salt of a dithiocarbamic acid for terminating an emulsion polymerization of 1,3-butadiene and copolymerizable monomers. Such combination is found to be effective at a level as low as 0.01 to 0.1%, based on sulphur or its equivalent, for each of the two components. Accordingly the thiocarbonyl-functional compounds are used for short stopping the polymerization reaction and not for a treatment of the formed raw polymer latex to modify its mechanical properties to achieve a combination of high tensile strength and/or elongation at break with an enhanced softness. Furthermore, as evidenced by U.S. Pat. No. 2,662,876 the use of sulphur donor substances in amounts of 0.2 wt. % or more, based on the initial monomer content of the emulsion, is conventionally associated with undesirable side-effects such as intense staining and poor storage stability of the polymer latex.

The present invention thus aims to overcome or at least alleviate the afore-mentioned shortcomings and disadvantages of the prior art seeking in particular to provide a curable polymer latex composition that imparts an ageing-stable combination of mechanical properties favourable for reducing the latex film thickness in rubber articles such as gloves, in particular an enhanced softness in combination with a high tensile strength, in a cost-efficient manner compatible with existing polymer latex preparation and processing techniques without affecting other characteristics relevant for the intended application of the rubber articles such as odour and color in an unacceptable manner.

SUMMARY OF THE INVENTION

Surprisingly, the present inventors found that the above objective can be attained by a curable polymer latex composition made by a method comprising:
(a) subjecting a monomer mixture comprising
  i. at least one conjugated diene;
  ii. at least one ethylenically unsaturated nitrile;
  iii. optionally at least one ethylenically unsaturated acid; and
  iv. optionally at least one further ethylenically unsaturated compound different from any of the compounds (i)-(iii);
  to free-radical emulsion polymerization in an aqueous reaction medium to form a raw polymer latex,
(b) allowing the obtained raw polymer latex to mature in the presence of at least one thiocarbonyl-functional compound, wherein at least one thiocarbonyl-functional compound is present in an amount of at least 0.05 wt.-%, based on the total amount of monomers subjected to free-radical emulsion polymerization in step (a); and
(c) optionally compounding the matured polymer latex with one or more cross-linking agent.

Rubber articles made from such curable polymer latex composition are also within the scope of the present invention.

According to a further aspect the present invention is directed to a method for making such rubber articles, the method comprising:
(a) providing a mold having a desired shape of the final article;
(b) immersing the mold in a coagulant bath;
(c) removing the mold from the coagulant bath and optionally drying it;
(d) immersing the mold treated according to steps (b) and (c) in a curable polymer latex composition according to the present invention;
(e) removing the mold from the polymer latex composition;
(f) optionally immersing the latex coated mold in an aqueous cleaning bath and/or drying the latex coated mold;
(g) heat treating the latex coated mold obtained from step (e) or (f) at a temperature in the range of 80° C. to 200° C. to form a latex article on the mold; and
(h) removing the formed article from the mold.

Further aspects of the present invention relate to:
the use of a curable polymer latex composition according to the present invention for the manufacture of dip molded articles, in particular gloves;
the use of a curable polymer latex composition according to the present invention for coating and impregnating a substrate;
the use of a thiocarbonyl-functional compound as an additive to a monomer mixture comprising at least one conjugated diene and at least one ethylenically unsaturated nitrile or to a raw polymer latex formed therefrom by free-radical emulsion polymerization in an aqueous reaction medium for reducing the modulus $M_{300}$ and/or $M_{500}$ of rubber articles obtainable by curing a curable composition comprising the formed polymer latex without substantially degrading the tensile strength and/or elongation at break with respect to rubber articles obtained in the same manner from a corresponding curable composition comprising a polymer latex, but without the addition of the thiocarbonyl-functional compound.

The present invention is based on the surprising finding that a polymer latex obtained by free-radical emulsion polymerization of a monomer mixture comprising at least one conjugated diene and at least one ethylenically unsaturated nitrile can be modified such that it imparts an enhanced softness in combination with a high tensile strength to latex films derived therefrom by allowing the raw polymer latex to mature, preferably at elevated temperature, in the presence of an effective amount of one or more than one thiocarbonyl-functional compound prior to compounding, if any.

The present invention will be described in more detail in the following.

DETAILED DESCRIPTION OF THE PRESENT INVENTION

As set forth above the present invention relates to a polymer latex obtained by free-radical emulsion polymerization of a monomer mixture in an aqueous reaction medium, being subjected to maturing in the presence of at least one thiocarbonyl-functional compound prior to compounding with one or more cross-linking agent, if any.

The monomer mixture subjected to free-radical emulsion polymerization according to the present invention generally comprises:
  i. at least one conjugated diene;
  ii. at least one ethylenically unsaturated nitrile;
  iii. optionally at least one ethylenically unsaturated acid; and
  iv. optionally at least one further ethylenically unsaturated compound different from any of the compounds (i)-(iii).

Conjugated diene monomers are polymerizable organic compounds which comprise two C=C bonds in conjugation to each other, i.e. the C=C bonds are separated from each other by one single bond. Further unsaturated moieties may optionally be present in these monomers. Conjugated diene monomers suitable for the preparation of the latices according to the present invention typically comprise from 4 to 18, preferably from 4 to 12, from 4 to 8, or from 4 to 6 carbon atoms. Conjugated diene monomers suitable according to the present invention can be hydrocarbon compounds or comprise additional heteroatoms such as e.g. one or more halogen atom, preferably being hydrocarbon compounds. They may have various molecular structures such as linear, branched or cyclic. Non-limiting examples of suitable conjugated diene monomers include e.g. 1,3-butadiene, 1,3-pentadiene, isoprene, 1,3-hexadiene, 2,3-dimethyl-1,3-butadiene, 2-chloro-1,3-butadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, α: 3,7-dimethyl-1,3,7-octatriene, β: 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4, 6-octatriene, 2-phenyl-1,3-butadiene, 2-methyl-3-isopropyl-1,3-butadiene and 1,3-cyclohexadiene.

The monomer mixture used to prepare the polymer latices according to the present invention typically comprises 1,3-butadiene, 2,3-dimethyl-1,3-butadiene, isoprene or a combination thereof as conjugated diene component (i). Herein, 1,3-butadiene, isoprene and combinations thereof are preferably used as conjugated diene according to the present invention.

Typically the monomer mixture comprises the at least one conjugated diene monomer (i) in an amount ranging from 20 to 90 wt.-%, preferably from 25 to 85 wt.-%, more preferred from 30 to 80 wt.-% or from 40 to 75 wt.-%, most preferred from 50 to 70 wt.-%, based on the total amount of the monomers. Thus, the conjugated diene may be present in the monomer mixture in amounts of at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, at least 40 wt.-%, at least 45 wt.-%, or at least 50 wt.-%, based on the total amount of the monomers. Accordingly, the at least one conjugated diene monomer may be used in the monomer mixture subjected to emulsion polymerization according to the present invention in amounts of no more than 90 wt.-%, no more than 85 wt.-%, no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, or no more than 56 wt.-%, based on the total amount of the monomers. A person skilled in the art will appreciate that any range between any of the explicitly disclosed lower and upper limit is herein disclosed.

As set forth above the monomer mixture used to prepare the polymer latices according to the present invention further comprises at least one ethylenically unsaturated nitrile. The term "ethylenically unsaturated nitrile" means herein any polymerizable organic compound, which comprises at least one C=C bond and at least one nitrile group, i.e. a group of the structure —C≡N. The ethylenically unsaturated nitrile may for instance comprise one nitrile group or two nitrile groups. According to the present invention the at least one nitrile monomer typically comprises from 3 to 8, such as from 3 to 6 or from 3 to 4 carbon atoms. The ethylenically unsaturated nitrile compound can have a linear or a branched molecular structure. Non-limiting examples of ethylenically unsaturated nitrile monomers that can be used according to the present invention include acrylonitrile, methacrylonitrile, fumaronitrile, alpha-cyanoethyl acrylonitrile, and combinations thereof. The monomer mixture used to prepare the polymer latices according to the present invention may comprise in particular acrylonitrile, methacrylonitrile or a combination thereof as ethylenically unsaturated nitrile (ii). The use of acrylonitrile is particularly preferred.

According to the present invention the monomer mixture comprises the at least one ethylenically unsaturated nitrile (ii) typically in an amount ranging from 10 to 50 wt.-%, preferably from 15 to 45 wt.-%, more preferred from 20 to 40 wt.-%, most preferred from 25 to 38 wt.-%, based on the total amount of the monomers. Thus, the at least one ethylenically unsaturated nitrile may be present in amounts of at least 12 wt.-%, at least 14 wt.-%, at least 16 wt.-%, at least 18 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 35 wt. % or at least 36 wt.-%, based on the total amount of the monomers. Accordingly, the at least one ethylenically unsaturated nitrile can be used in amounts of no more than 50 wt.-%, no more than 45 wt.-%, no more than 43 wt.-%, no more than 40 wt.-%, no more than 38 wt.-%, no more than 36 wt.-%, no more than 34 wt.-%, no more than 32 wt.-%, no more than 30 wt.-%, no more than 28 wt.-%, no more than 26 wt.-%, no more than 24 wt.-%, no more than 22 wt.-%, or no more than 20 wt.-%, based on the total amount of the monomers. A person skilled in the art will appreciate that any range between any of the explicitly disclosed lower and upper limit is herein disclosed.

The polymer latices according to the present invention can be obtained from monomer mixtures, which contain merely at least one conjugated diene and at least one ethylenically unsaturated nitrile. Optionally, the monomer mixture may however comprise in addition to the at least one conjugated diene and the at least one ethylenically unsaturated nitrile one or more other ethylenically unsaturated monomer(s).

In particular the monomer mixture used to prepare the polymer latices according to the present invention may thus comprise at least one ethylenically unsaturated acid. Herein the term "ethylenically unsaturated acid" means any polymerizable organic compound, which comprises at least one C=C bond and at least one acid functional group or a salt thereof. The term "acid group" means a polar group capable of donating a proton in aqueous medium or a precursor to such polar group. Non-limiting examples of acid groups include carboxylic acid, anhydride, sulfonic acid, sulphuric acid, phosphonic acid and phosphoric acid groups. Typically the at least one acid group is selected from a carboxylic acid group, an anhydride group, a sulfonic acid group or a combination thereof. According to the present invention the at least one ethylenically unsaturated acid monomer typically comprises from 3 to 12, such as from 3 to 8 or from 3 to 6 carbon atoms. Besides the at least one acid group or salt thereof the ethylenically unsaturated acid monomer may optionally comprise one or more additional functional group(s) such as hydroxyl, ester, amino and/or ether. Ethylenically unsaturated acid monomers suitable for use in the present invention include e.g. monocarboxylic acid and dicarboxylic acid monomers and monoesters of dicarboxylic acids. Preferably the at least one ethylenically unsaturated acid monomer, if present, is selected from ethylenically unsaturated aliphatic mono- or dicarboxylic acids or anhydrides which contain from 3 to 6 carbon atoms. Non-limiting examples of suitable monocarboxylic acid monomers include acrylic acid, methacrylic acid, ethacrylic acid, 2-carboxyethyl acrylate, crotonic acid and salts thereof. Suitable dicarboxylic acid monomers include for example fumaric acid, itaconic acid, maleic acid and salts thereof. A suitable anhydride monomer is for instance maleic anhydride. Non-limiting examples of other suitable ethylenically unsaturated acid monomers include vinyl acetic acid, vinyl lactic acid, vinyl sulfonic acid, 2-methyl-2-propene-1-sulfonic acid, sodium 4-vinylbenzenesulfonate, 3-allyloxy-2-hydroxy-1-propanesulfonic acid, 4-styrene sulfonic acid, 2-acrylamido-2-methyl-1-propanesulfonic acid and salts thereof.

If used, the at least one optional ethylenically unsaturated acid monomer may be present in the monomer mixture used according to the present invention in an amount up to 20 wt.-%, based on the total amount of the monomers. Typically, such an amount is from 0.1 to 10 wt.-%, preferably from 0.5 to 9 wt.-%, more preferred from 1 to 8 wt.-%, even more preferred from 2 to 7 wt.-%, most preferred 3 to 7 wt.-%, based on the total amount of the monomers. Thus, the at least one optional ethylenically unsaturated acid monomer may be present in an amount of at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%, based on the total amount of the monomers. Likewise, the at least one optional ethylenically unsaturated acid monomer may be present in an amount of no more than 20 wt.-%, no more than 10 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total amount of the monomers. A person skilled in the art will appreciate that any range defined by an explicitly disclosed lower limit and an explicitly disclosed upper limit is disclosed herewith.

The monomer mixture used to prepare the polymer latices according to the present invention may optionally comprise in addition to (i) the at least one conjugated diene, (ii) the at least one ethylenically unsaturated nitrile and (iii) the at least one ethylenically unsaturated acid, if any, one or more than one further ethylenically unsaturated compound different from any of the compounds (i)-(iii).

Such optional ethylenically unsaturated compound different from any of the compounds (i)-(iii) may be any polymerizable compound containing one or more than one ethylenically unsaturated moiety/moieties. Possible ethylenically unsaturated compounds of this kind comprise for instance vinyl ethers, vinyl-aromatic compounds, ethylenically unsaturated esters, amides of ethylenically unsaturated acids or ethylenically unsaturated organosilicon compounds, and vinyl compounds containing sulphonate ester, sulphonic acid amide and/or heterocyclic groups. Furthermore also one or more monomer(s) imparting self-crosslinking capability to a latex can be used according to the present invention, for example ethylenically unsaturated organosilicon compounds or ethylenically unsaturated compounds that comprise one or more functional group that may provide a latex with self-crosslinking capability such as N-methylolamide groups or oxirane groups.

Representatives of suitable vinyl-aromatic monomers include, for example, styrene, t-butyl styrene, vinyltoluene, divinylbenzene, p-tert-butylstyrene, 2,4-dimethylstyrene, 2-methylstyrene, 3-methylstyrene, 4-methylstyrene, 2-ethylstyrene, 3-ethylstyrene, 4-ethylstyrene, 2,4-diisopropylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinyl naphthalene, vinyltoluene, vinylxylene, 1,1-diphenylethylenes and substituted 1,1-diphenylethylenes, 1,2-diphenylethene and substituted 1,2-diphenylethylenes. Mixtures of two or more of the vinyl-aromatic compounds may also be used. Vinyl-aromatic monomers, which may preferably be used according to the present invention, include for example styrene and/or 2-methylstyrene.

Suitable heterocyclic vinyl compounds that can be employed according to the present invention include for example, without being limited thereto, 2-vinylpyridine, 4-vinylpyridine, N-vinyl pyrrolidone, N-vinyl caprolactam and 1-vinyl imidazole.

Ethylenically unsaturated ester compounds that may be used as optional monomers for preparing the polymer latices according to the present invention include vinyl esters and esters of ethylenically unsaturated acids.

Suitable vinyl ester compounds which can be used according to the present invention include vinyl esters of carboxylic acids, for example vinyl acetate, vinyl propionate, vinyl butyrate, vinyl benzoate, vinyl-2-ethylhexanoate, vinyl stearate, and the vinyl esters of versatic acid, whereof vinyl acetate is preferred. Other vinyl ester compounds that can be used in the manufacture of the polymer latices according to the present invention include for example vinyl esters of acids other than carboxylic acids such as sulfonic acids and phosphonic acids, such as for instance phenyl vinylsulfonate.

Esters of ethylenically unsaturated acids useful as optional monomer according to the present invention are compounds derivable by esterification of an ethylenically unsaturated acid or anhydride such as any of those mentioned above in the context of the ethylenically unsaturated acid. Non-limiting examples are for instance esters of acrylic acid and methacrylic acid, collectively referred to herein (meth)acrylic acid. Suitable esters of (meth)acrylic acid that can be used according to the present invention include for example n-alkyl esters, iso-alkyl esters or tert-alkyl esters of (meth)acrylic acid in which the alkyl group has from 1 to 20 carbon atoms, the reaction product of (meth)acrylic acid with a glycidyl ester of a neoacid such as versatic acid, neodecanoic acid or pivalic acid, hydroxyalkyl (meth)acrylate and alkoxyalkyl (meth)acrylate monomers. Alkyl esters of (meth)acrylic acids may in particular be $C_1$-$C_{10}$ alkyl (meth)acrylates. Non-limiting examples of such (meth)acrylate monomers include methyl acrylate, isopropyl acrylate, n-propyl acrylate, n-butyl acrylate, sec-butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, n-propyl methacrylate, hexyl methacrylate, 2-ethyl-hexyl methacrylate, cyclohexyl methacrylate and cetyl methacrylate. The alkyl group of the alkyl esters of (meth)acrylic acids can also be a substituted alkyl group, which bears one or more functional group such as e.g. a hydroxyl, alkoxy, polyether or amino group. Hydroxy alkyl(meth)acrylate monomers which can optionally be used to prepare the polymer latex according to the present invention include e.g. hydroxyalkyl acrylate and methacrylate monomers which are addition products of the respective acid with ethylene oxide, propylene oxide, higher alkylene oxides or a combination thereof. Non-limiting specific examples include hydroxyethyl acrylate, hydroxypropyl acrylate, hydroxyethyl methacrylate, hydroxypropyl methacrylate and hydroxybutyl acrylate. Suitable alkoxyalkyl (meth)acrylate monomers can be exemplified, without being limited thereto, by methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate, whereof ethoxyethyl acrylate and methoxyethyl acrylate represent preferred alkoxyalkyl (meth)acrylate monomers. Suitable amino alkyl(meth)acrylate monomers can be exemplified for instance by 2-Aminoethyl (meth)acrylate and salts thereof.

Amides of ethylenically unsaturated acids that can optionally be used as monomer for the preparation of the polymer latex according to the present invention include, without being limited thereto, acrylamide, methacrylamide, and diacetone acrylamide, N-(2-aminoethyl) (meth)acrylamide and salts thereof, whereof acrylamide is preferred.

In order to introduce functional groups that are capable of self-crosslinking upon heat treatment, monomers with self-crosslinking functionality, e.g. monomers comprising one or more than one N-methylol amide group and/or oxirane-functional ethylenically unsaturated monomers may be employed. Suitable monomers are for example N-methylol (meth)acrylamide, N-methoxymethyl-(meth)acrylamide, N-n-butoxy-methyl-(meth)acrylamide, N-iso-butoxy-methyl-(meth)acrylamide, N-acetoxymethyl-(meth)acrylamide, N(-2,2-dimethoxy-1-hydroxyethyl) acrylamide. Suitable oxirane-functional ethylenically unsaturated monomers, which may be used according to the present invention include for example glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmeth-acrylate, 2-(n-butyl)glycidylacrylate, 2-(n-butyl)glycidylmethacrylate, glycidylmethyl-methacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate and combinations thereof. Ethylenically unsaturated organosilicon compounds, which can optionally be used as monomer according to the present invention include silanes, siloxanes and silicones which have at least one organic substituent that comprises one or more ethylenically unsaturated moiety such as a vinyl group, an allyl group or a group derived from an ethylenically unsaturated acid such as (meth)acrylic acid. Non-limiting examples of suitable ethylenically unsaturated silicon-containing compounds include for instance trimethoxy(vinyl)silane, triethoxy(vinyl)silane, styrylethyltrimethoxysilane and 3-methacryloxypropyltrimethoxysilane. Other ethylenically unsaturated monomers with self-crosslinking functionality, which may optionally be used in the monomer mixture for obtaining the polymer latices according to the present invention, are for example disclosed in WO 2016/013666 A1.

If used, the one or more than one optional ethylenically unsaturated monomer different from monomers (i) to (iii) as defined above, may typically be present in the monomer mixture used according to the present invention in an amount of up to 20 wt.-%, based on the total amount of the monomers. Typically, such optional monomers, if any, are used in a an amount from 0.1 to 15 wt.-%, preferably from 0.5 to 10 wt.-%, more preferred from 1 to 8 wt.-%, even more preferred from 2 to 7 wt.-%, most preferred 3 to 7 wt.-%, based on the total amount of the monomers. Thus, the at least one optional ethylenically unsaturated monomer different from monomers (i) to (iii) as defined above may e.g. be present in an amount of at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, at least 3 wt.-%, at least 4 wt.-%, or at least 5 wt.-%, based on the total amount of the monomers. Likewise, the at least one optional ethylenically unsaturated monomer different from monomers (i) to (iii) as defined above may be present in an amount of no more than 20 wt.-%, no more than 15 wt.-%, no more than 10 wt.-%, no more than 9 wt.-%, no more than 8 wt.-%, no more than 7 wt.-%, no more than 6 wt.-%, no more than 5 wt.-%, no more than 4 wt.-%, no more than 3 wt.-%, no more than 2 wt.-%, or no more than 1 wt.-%, based on the total amount of the monomers. A person skilled in the art will appreciate that any range defined by an explicitly disclosed lower limit and an explicitly disclosed upper limit is disclosed herewith.

According to the present invention the monomer mixture used for emulsion polymerization may thus comprise in particular:
- 20 to 90 wt. % of the at least one conjugated diene (i);
- 10 to 50 wt. % of the at least one ethylenically unsaturated nitrile (ii);
- 0 to 20 wt. % of the optional at least one ethylenically unsaturated acid (iii); and
- 0 to 20 wt. % of the optional at least one further ethylenically unsaturated compound (iv), which is different from any of the compounds (i)-(iii);

wherein the weight percentages are based on the total amount of monomers. Suitable compounds and preferable ranges of the amounts of the different components (i) to (iv) of the monomer mixture are disclosed above and can be selected from accordingly. As appreciated by the skilled artisan the sum of the weight percentages of (i) the at least one conjugated diene, (ii) the at least one ethylenically unsaturated nitrile, (iii) the optional at least one ethylenically unsaturated acid and (iv) the optional at least one further ethylenically unsaturated compound different from any of the compounds (i)-(iii) amounts in any case to 100 wt.-%.

While it is thus possible that the monomer mixture used to prepare the polymer latices according to the present invention contains one or more than one monomer other than a conjugated diene, an ethylenically unsaturated nitrile and an ethylenically unsaturated acid, preferably the monomer mixture substantially comprises only
i. at least one conjugated diene;
ii. at least one ethylenically unsaturated nitrile; and
iii. optionally at least one ethylenically unsaturated acid.

By "substantially comprises" it is meant that only the explicitly specified monomer components are deliberately combined to form the monomer mixture. Nevertheless in such case other ethylenically unsaturated compounds (iv) may still be present in the monomer mixture as impurities in amounts, which generally will be below 0.5 wt.-%, preferably less than 0.35 wt.-% and most preferably less than 0.1 wt.-% based on the total amount of the monomers. Such low amounts are deemed to have no noticeable effect on the properties of the resultant polymer latex.

Preferably the monomer mixture used to prepare the polymer latices according to the present invention comprises (i) 1,3-butadiene, (ii) acrylonitrile and optionally (iii) at least one ethylenically unsaturated acid. In particular such monomer mixture can comprise from 50 to 80 wt.-% of 1,3-butadiene, from 20 to 50 wt.-% of acrylonitrile and optionally up to 10 wt.-% of at least one ethylenically unsaturated acid, based on the total amount of monomers. More particularly the monomer mixture may comprise from 60 to 75 wt.-% of 1,3-butadiene, from 25 to 40 wt.-% acrylonitrile and optionally up to 7 wt.-% of at least one ethylenically unsaturated acid, based on the total amount of monomers.

The preparation of the polymer latices according to the present invention involves subjecting a monomer mixture as defined above to free-radical emulsion polymerization in an aqueous reaction medium.

The manner in which the ethylenically unsaturated monomers are subjected to free-radical emulsion polymerization for preparing the polymer latices according to the present invention is not critical. Preparation techniques and conditions for carrying out the free-radical emulsion polymerization of the monomers according to the present invention can be adopted from known conventional latex emulsion polymerization processes. An exemplary emulsion polymerization process is described for instance in U.S. Pat. No. 5,750,618, Chemistry and Technology of Emulsion Polymerization, 2nd Edition, A. M. van Herk (Editor), ISBN: 978-1-119-95372-2; Emulsion Polymerization, A. van Herk, H. Heuts in Encyclopedia of Polymer Science and Technology, Online ISBN: 9780471440260, Emulsion Polymer Technology (Ed) Robert D. Athey, CRC Press, 1 Mar., 1991.

In general free-radical emulsion polymerization typically includes emulsifying the monomers in the aqueous reaction medium in a stable manner by use of a surfactant and/or protective colloid, and generating radical species e.g. from a suitable initiator, which starts the polymerization reaction. Subsequent radical chain growth polymerization through consumption of the ethylenically unsaturated monomers then proceeds to yield a polymer latex.

Accordingly the free-radical emulsion polymerization of the monomers to prepare the polymer lattices according to the present invention is usually conducted in the presence of at least one surfactant and/or at least one protective colloid. Furthermore typically one or more than one initiator is present in the aqueous reaction medium.

Surfactants which are suitable for emulsifying the monomers and stabilizing the latex particles include those surface-active agents conventionally used for polymerization processes. The surfactant(s) can be added to the aqueous phase and/or the monomer phase.

Representative surfactants include for example saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, alkali metal salts of alkyl ether sulfates, such as sodium lauryl ether sulfate, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 10 wt. %, preferably from 0 to 5 wt. %, more preferably from 0 to 3 wt. %, such as from 0.005 to 8 wt.-%, from 0.01 to 5 wt. %, or from 0.05 to 3 wt.-%, based on the total amount of the monomers. The amount of surfactant includes all values and sub-values there between, especially including 0 wt.-%, 0.001 wt.-%, 0.01 wt.-%, 0.05 wt.-%, 0.1 wt.-%, 0.2 wt.-%, 0.3 wt. %, 0.4 wt.-%, 0.5 wt.-%, 0.7 wt.-%, 1 wt.-%, 1.5 wt.-%, 2 wt.-%, 3 wt.-%, 4 wt.-%, 5 wt.-%, 6 wt.-%, 7 wt.-%, 8 wt.-%, 9 wt.-% and 10 wt.-%, based on the total amount of the monomers.

Various protective colloids can also be used instead of or in addition to the surfactants described above. Suitable colloids include polyhydroxy compounds, such as polyvinyl alcohol and partially acetylated polyvinyl alcohol, casein, hydroxyethyl starch, carboxymethylcellulose, hydroxyethylcellulose, hydroxypropylcellulose, polyethylene glycol, polyvinyl pyrrolidone, polysaccharides and degraded polysaccharides, and gum arabic. The preferred protective colloids are polyvinyl alcohols, polysaccharides and degraded polysaccharides. In general, these protective colloids are used in contents of from 0 to 10 wt.-%, preferably from 0 to 5 wt.-%, more preferably from 0 to 2 wt.-%, based on the total amount of the monomers. The amount of protective colloids includes all values and subvalues there between, especially including 1, 2, 3, 4, 5, 6, 7, 8 and 9 wt.-%, based on the total amount of the monomers.

Initiators which can be used when carrying out the present invention include water-soluble and/or oil-soluble initiators which are effective for the purposes of the polymerization. Representative initiators are well known in the technical area and include, for example: azo compounds such as, for example, AIBN, AMBN and cyanovaleric acid, inorganic peroxy compounds such as hydrogen peroxide, sodium, potassium and ammonium peroxydisulfate, peroxycarbonates and peroxyborates, as well as organic peroxy compounds such as alkyl hydroperoxides, dialkyl peroxides, acyl hydroperoxides, and diacyl peroxides, as well as esters such as tertiary butyl perbenzoate and combinations of inorganic and organic initiators.

The initiator is used in a sufficient amount to initiate the polymerization reaction at a desired rate. In general, an amount of initiator of from 0.01 wt.-% to 5 wt.-%, preferably from 0.1 wt.-% to 4 wt.-%, based on the total amount of the monomers, is sufficient. The amount of initiator is most preferably from 0.01 wt.-% to 2% wt.-%, based on the total amount of the monomers. The amount of initiator includes all values and subvalues there between, especially including 0.01, 0.1, 0.5, 1, 1.5, 2, 2.5, 3, 4 and 4.5% by weight, based on the total amount of the monomers.

The above mentioned inorganic and organic peroxy compounds may be used alone or in combination with one or more suitable reducing agents as is well known in the art. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. The quantity of the reducing agent is preferably 0.03 to 10 parts by weight per part by weight of the polymerization initiator.

Other auxiliary agents frequently used in conventional emulsion polymerization processes can also be used in the preparation of the polymer latices of the present invention depending on requirements. Such further auxiliary agents include, without being limited thereto, pH regulators, buffer substances, chelating agents, chain transfer agents and short stopping agents.

Non-limiting examples of suitable buffer substances are for instance alkali metal carbonates and hydrogen carbonates, phosphates and pyrophosphates. Suitable chelating agents can be exemplified by alkali metal salts of ethylenediaminetetraacetic acid (EDTA) or hydroxyl-2-ethylenediaminetriacetic acid (HEEDTA). The quantity of buffer substances and chelating agents is usually 0.001-1 weight percent, based on the total amount of monomers.

Chain transfer agents may be used for controlling the average molecular weight of the polymer chains formed in the emulsion polymerization process. Non-limiting examples of suitable chain transfer agents are organic sulfur compounds such as thioesters, for example alkylthioesters such as ethyl thioacetate, propyl thioacetate, ethyl thiopropionate, lauryl thiopropionate, methyl thiobutyrate, propyl thiobutyrate; alkyl thioglycolates such as, butylthioglycolate, hexylthioglycolate, laurylthioglycolate, 2-ethylhexylthioglycolate and isooctyl thioglycolate and thiopropionates, and the like; di-mercaptans (e.g. 1,2-ethane-dithiol) and alkyl ethers such as 2-mercaptoethyl ether. Alternatively, or additionally 2-mercaptoethanol, 3-mercaptopropionic acid and $C_1$-$C_{12}$ alkyl mercaptans may be used, whereof n-dodecylmercaptan and t-dodecylmercaptan are preferred. The quantity of chain transfer agents, if present, is usually 0.05-3.0 weight percent, preferably 0.2-2.0 weight percent, based on the total amount of the monomers.

The emulsion polymerization of the ethylenically unsaturated monomers contained in the monomer mixture can optionally be carried out in the presence of a seed latex, in particular when adjusting a certain particle size is desired. The seed latex may be a pre-formed external seed latex, which is added to the aqueous reaction medium typically before initiation of the polymerization reaction of the mixture of monomers. Alternatively the seed latex may be prepared in-situ, i.e. in the same vessel as the latex polymerisation is carried out. The z-average particle size of the initially introduced or formed seed latex measured with a Malvern zetasizer nano S (ZEN 1600)® using dynamic light scattering (DLS) of the seed latex particles preferably is 10 to 90 nm, more preferably 15 to 80 nm, more preferred 20 to 70 nm. The lower limit of the z-average particle size therefore can be 10 nm, 11 nm, 12 nm, 13 nm, 14 nm, 15 nm, 16 nm, 17 nm, 18 nm, 19 nm, or 20 nm, whereas the upper limit can be 80 nm, 75 nm, 70 nm, 65 nm, 60 nm, 55 nm, 50 nm, 45 nm, 40 nm, 38 nm, 36 nm, 34 nm, 32 nm, or 30 nm. A person skilled in the art will understand that any range formed by any of the explicitly disclosed lower limits and upper limits is explicitly encompassed in the present specification. The seed latex that may optionally be used according to the present invention can have a chemical composition corresponding to polymer latices of the present invention described above in terms of the composition of the monomer mixture used to prepare the polymer latex. However, it is also possible to employ a seed latex with a different chemical composition compared to the polymer latices prepared according to the present invention. For example the relative amounts of the monomers used to prepare the seed latex may be different compared to the polymer latex according to the present invention prepared using such seed latex. The used seed latex may for example comprise a higher proportion of constituting units derived from ethylenically unsaturated nitrile monomer(s) compared to the polymer latex according to the present invention prepared by use of that seed latex, alternatively, it may comprise a lower proportion of constituting units derived from ethylenically unsaturated nitrile monomer(s) compared to the polymer latex according to the present invention prepared by use of that seed latex. For example a seed latex (internal or external seed latex) can be used according to the present invention, which has a composition, in terms of the monomers used to prepare the seed latex, of: (i) 0 to 100 wt.-% of at least one conjugated diene, (ii) 0 to 100 wt.-% of at least one ethylenically unsaturated nitrile and (iii) 0 to 10 wt. % of one or more than one optional further ethylenically unsaturated monomer such as an ethylenically unsaturated acid, wherein the percentages of (i), (ii) and (iii) are based on the total amount of monomers used to prepare the seed latex. It is to be understood that the amounts of (i), (ii) and (iii) sum up to 100 wt.-% in each case. The conjugated diene, ethylenically unsaturated nitrile and optional further ethylenically unstaturated monomers can be as described above with respect to the monomer mixture subjected to emulsion polymerization according to the present invention. A preferred seed latex comprises predominantly constitutional units derived from ethylenically unsaturated nitrile. For example the seed latex can be prepared from a monomer mixture comprising at least 50 wt.-%, such as at least 65 wt. %, at least 75 wt. %, at least 80 wt.-%, at least 85 wt. %, at least 90 wt. % or at least 95 wt. % or 100 wt. % of the at least one ethylenically unsaturated nitrile (ii).

Another particular non-limiting type of seed latex that can be used for preparation of the polymer latex according to the present invention comprises polymer particles comprising structural units derived from at least one monomer selected from the group of vinyl aromatic compounds, ethylenically unsaturated acids and esters thereof. Such external seed latex could for instance comprise structural units derived from styrene, alkyl (meth)acrylates, (meth)acrylic acid or a combination thereof, preferably in an amount of more than 50 wt.-%, based on the total weight of the seed latex. Optionally the seed polymer may be crosslinked for example, in the presence of monomers having at least two ethylenically unsaturated groups. Such crosslinking monomers can for example be selected from divinyl benzene 1,2-ethyleneglycol di(meth)acrylate, 1,4-butanediol di(meth)acrylate, 1,6-hexanediol di(meth)acrylate and combinations thereof. Alternatively also fine particulate material other than a latex such as particulate inorganic pigments or clays could be used as a seed for the emulsion polymerization according to the present invention. For example pigments having a Z-average particle size of 5-100 nm, such as silica sols, are suitable for this purpose.

If a seed material such as a seed latex or particulate pigment is used in the preparation of the polymer latices according to the present invention it is typically used in an amount corresponding to 0.01 to 5 wt.-%, preferably 0.1-3 wt.-%, based on the total amount of the monomers subjected to the free-radical emulsion polymerization process.

The emulsion polymerization with or without seeding can be performed at a temperature from 0 to 130° C., preferably from 0 to 100° C., more preferably from 5 to 70° C., or from 10° C. to 60° C. or from 15° C. to 50° C., or from 15° C. to 40° C. or from 20° C. to 35° C., such as at a temperature of 25° C.±10° C. The temperature includes all values and sub-values there between, especially including 5, 10, 15, 20, 25, 30, 35, 40, 45, 50, 55, 60, 65, 70, 75, 80, 85, 90, 95, 100, 105, 110, 115, 120 and 125° C.

The manner in which the monomers are introduced to the reaction mixture is not particularly limited. The emulsion polymerization according to the present invention can accordingly be carried out for example with monomer feed in batch, pseudobatch or continuous mode. Particularly suitable is the process as described in EP-A 792 891.

The emulsion polymerization is carried out under conditions as indicated above, until the desired conversion of monomer has been reached. The polymerization may then be terminated by addition of a "short stop" (or "short stopping") agent such as butane-2,3-dione, hydroquinone or its monomethyl derivative, hydroxylamine or its N-substituted derivative (such as isopropyl hydroxylamine, N,N-diethyl hydroxylamine). Alternative short stopping agents include the alkali metal salts of dithionous acid, such as sodium dithionite.

The raw polymer latex obtained from the emulsion polymerization is then allowed to mature in the presence of the at least one thiocarbonyl-functional compound according to the present invention. Maturing means a process causing a chemical modification of the raw polymer latex by exposure to the thiocarbonyl-functional compound(s). Maturing can comprise keeping a mixture comprising the raw polymer latex and the thiocarbonyl-functional compound(s) at defined conditions for a certain duration. Typically the mixture is stirred for maturing.

The obtained polymer latex may for example be allowed to mature in the presence of the at least one thiocarbonyl-functional compound in step (b) at room temperature or at an elevated temperature. It has been found that the modification of the raw polymer latex by the thiocarbonyl-functional compound(s) is particularly effective when the raw polymer latex is allowed to mature in the presence of the at least one thiocarbonyl-functional compound at a temperature of at least 35° C. The maturing may e.g. occur at a temperature of at least 40° C., at least 45° C., at least 50° C., at least 55° C., at least 60° C., at least 65° C., or at least 70° C. The maturing may for example be performed at a temperature of no more than 100° C., no more than 95° C., no more than 90° C., no more than 85° C., no more than 80° C., or no more than 75° C. The maturing may for example be performed at a temperature in the range of 40° C. to 90° C., preferably 55° C. to 90° C., more preferably 60° C. to 80° C.

The obtained raw polymer latex is typically allowed to mature in the presence of the at least one thiocarbonyl-functional compound in step (b), for a duration of at least 3 minutes, at least 5 min, at least 10 min, at least 15 min, at least 20 min, at least 30 min, at least 45 min, at least 1 hour, at least 90 min, at least 2 hours, at least 3 hours, at least 4 hours, at least 5 hours, at least 6 hours, at least 7 hours, or at least 8 hours. The maturing can be carried out for a duration of no more than 48 hours, no more than 40 hours, no more than 35 hours, no more than 30 hours, no more than 27 hours, no more than 24 hours, no more than 20 hours, no more than 18 hours, no more than 16 hours, no more than 14 hours, or no more than 12 hours. Typically the raw polymer latex is allowed to mature in the presence of the at least one thiocarbonyl-functional compound for a duration in the range from 10 minutes to 30 hours, preferably 30 min to 20 hours, more preferably 1 hour to 15 hours.

Typically maturing of the raw polymer latex in the presence of the thiocarbonyl-functional compound(s) is carried out at a temperature in the range of 40° C. to 100° C., such as preferably 50° C. to 90° C. or 60° C. to 80° C., for a period of time from 5 minutes to 30 hours, such as preferably 30 minutes to 20 hours or 1 hour to 15 hours.

The at least one thiocarbonyl-functional compound is generally added to the raw polymer latex prior to compounding with one or more cross-linking agent(s), if any. The at least one thiocarbonyl-functional compound used can for example be added to the aqueous reaction medium before or during the polymerization of the ethylenically unsaturated monomers in step (a). As used herein the expression "during the polymerization" means a state of ongoing polymerization in the aqueous reaction medium, i.e. after initiation of the polymerization process by generated free radical species and before the termination of the polymerization process, which can be effected e.g. by terminating the radical species in the system or by complete consumption of the monomers. The at least one thiocarbonyl-functional compound may in particular be added to the reaction medium at a late stage of the polymerization process. Thus the addition of the at least one thiocarbonyl-functional compound can for example be carried out at a monomer conversion in the range of 60% to 99.9%, preferably in the range of 70% to 98% such as 80% to 97% or 85% to 96% or 90% to 95%, based on the total amount of monomers. The degree of conversion can for example be estimated as a function of reaction time in comparison to a known reaction profile obtained by sampling the batch at defined elapsed times and measuring the degree of conversion using a total solids method, or using a gas chromatography analysis against known quantities of standards. Alternatively, the at least one thiocarbonyl-functional compound can be added to the raw polymer latex after termination of the polymerization reaction. Preferably the at least one thiocarbonyl-functional compound is added to the raw polymer latex after termination of the polymerization reaction and prior to compounding with one or more cross-linking agent(s), if any.

The thiocarbonyl-functional compound used according to the present invention is a compound that comprises at least one thiocarbonyl group, i.e. a group of the structure —C(=S)—. Typically the thiocarbonyl-functional compound used according to the present invention comprises in total one or two thiocarbonyl group(s). Thiocarbonyl-functional compounds that may be used according to the present invention include for example, without being limited thereto, thioketones, thioaldehydes, thioureas, thioamides, xanthates, thiocarbamates, dithiocarbamates, thiosemicarbazides, trithiocarbonates, thiooxamates, thiocarboxylic acids, dithiocarboxylic acids and mixtures or combinations of any of the foregoing.

Thioketones have a structure R—C(=S)—R', wherein R and R' each represent a monovalent organic group being bound to the carbonyl group by a carbon atom. The monovalent organic groups R and R' can e.g. comprise up to 18 carbon atoms such as from 1 to 10, from 1 to 6 or from 1 to 4 carbon atoms. The groups R and R' comprise hydrocarbyl groups as well as organic groups containing besides carbon and hydrogen one or more heteroatom such as oxygen, nitrogen or sulphur. Non-limiting examples of thioketone compounds include e.g. thioacetone, thiobenzophenone and 4,4'-bis(dimethylamino)thiobenzophenone.

Thioaldehydes have a structure R—C(=S)—H, wherein R is a monovalent organic group as defined with respect to thioketones above.

Thioureas represent compounds of the structure RR'N—C(=S)—NR"R"', wherein R, R', R", R''' are each independently selected from hydrogen and monovalent organic groups. The monovalent organic groups comprise aliphatic, aromatic or mixed aliphatic-aromatic groups, which may be unsubstituted (i.e. hydrocarbyl groups) or optionally be substituted by one or more heteroatom-containing functional group(s). The monovalent organic groups can e.g. comprise up to 18 carbon atoms such as from 1 to 12, from 1 to 8 or from 1 to 6 carbon atoms. The groups R, R', R", R''' can for instance be each independently selected from alkyl, aryl, cycloalkyl or aralkyl, which may optionally be substituted by one or more than one functional group such as hydroxyl, thiol or amine. Non-limiting examples include e.g. $C_{1-12}$ alkyl, aryl or aralkyl groups such as methyl, ethyl, isopropyl, n-propyl, n-butyl, sec-butyl, tert-butyl, amyl, hexyl, heptyl, phenyl, benzyl, tolyl, xylyl and 2-ethyl-hexyl and substituted derivatives of any of the foregoing. Two groups bound to the same nitrogen atom (i.e. R and R', or R" and R''') may also be replaced by a divalent organic group such as an alkylene group, which forms a ring structure together with the nitrogen atom. Non-limiting examples of thiourea compounds which can be used according to the present invention comprise thiourea $H_2N$—C(=S)—$NH_2$ and derivatives thereof, wherein one or more than one or all of the hydrogen atoms are replaced by an aliphatic, aromatic or mixed aliphatic-aromatic group such as methyl, ethyl, propyl, benzyl or phenyl.

Thiosemicarbazides are compounds of the structure RR'N—C(=S)—N(R")—NR'''R'''', wherein R, R', R", R''' and R'''' are each independently selected from hydrogen and monovalent organic groups as defined above for the thioureas. Non-limiting examples of suitable thiosemicarbazides are e.g. thiosemicarbazide $H_2N$—C(=S)—N(H)—$NH_2$, 4-methyl-3-thiosemicarbazide, 4-ethyl-3-thiosemicarbazide 2-methyl-3-thiosemicarbazide, 4,4-dimethyl-3-thiosemicarbazide or 4-phenylthiosemicarbazide.

Thioamides are organic compounds comprising at least one group of the structure —C(=S)—NR'R", wherein R' and R" are each independently selected from hydrogen and monovalent organic groups. The monovalent organic groups can be as defined above for the thiourea compounds. Non-limiting examples of thioamides that can be used as thiocarbonyl-functional compound according to the present invention include thioacetamide, dithiooxamide, 2-cyanothioacetamide, pyrazine-2-thiocarboxyamide, 3,4-difluorothiobenzamide, 2-bromothiobenzamide, 3-bromothiobenzamide, 4-bromothiobenzamide, 2-chlorothiobenzamide, 3-chlorothiobenzamide, 4-chlorothiobenzamide, 4-fluorothiobenzamide, thiobenzamide, 3-methoxy-thiobenzamide, 4-methoxythiobenzamide, 4-methylbenzenethioamide, thioacetanilide, 3-(acetoxy)thiobenzamide, 4-(acetoxy)thiobenzamide, 3-ethoxythiobenzamide, 4-ethylbenzene-1-thiocarboxyamide, 4'-hydroxybiphenyl-4-thiocarboxamide, 4-biphenylthioamide, 4'-methylbiphenyl-4-thiocarboxamide and anthracene-9-thiocarboxamide.

Xanthates mean salts and esters comprising at least one characteristic moiety —O—C(=S)—S. The xanthate esters can accordingly include at least one moiety —O—C(=S)—S—R', whereas the xanthate salts comprise anions of the structure R—O—C(=S)—S⁻. Herein, the groups R and R' are monovalent organic groups, which can be as defined above for the thioureas. Non-limiting examples of xanthates that can be used as thiocarbonyl-functional compound according to the present invention include e.g. metal salts, e.g. alkali metal salts, of O-ethyl xanthogenate or O-isopropyl xanthogenate, and S-alkyl ester analogues thereof as well as compounds with two xanthogen groups such as di-alkyl xanthogen di- or polysulphides, e.g. di-isopropyl xanthogen polysulphide (DIXP) or di-isopropyl xanthogen disulphide (DIDP).

Thiocarbamates or dithiocarbamates mean compounds comprising at least one moiety of the structure —O—C(=S)—NRR' or —S—C(=S)—NRR', respectively, wherein R and R' are each independently selected from hydrogen and monovalent organic groups. The monovalent organic groups can be as defined above for the thiourea compounds. Thiocarbamates can be exemplified by methyl carbamate or ethyl carbamate. Suitable dithiocarbamates, which can be used according to the present invention include for example benzyl-N,N-dimethyldithiocarbamate and thiuram compounds such as tetramethylthiuram monosulfide, tetraethylthiuram disulfide, tetraethylthiuram disulfide or tetraisopropylthiuram disulfide.

Trithiocarbonates have a structure R—S—C(=S)—S—R', wherein R and R' can each be a monovalent organic group, which can be as defined above for the thioureas, or can form together an annular substituent, such as an annular substituent with 5 to 8 atomic members. Trithiocarbonates can be exemplified by ethylene trithiocarbonate or S,S'-dimethyl trithiocarbonate.

Thiooxamates mean compounds of the structure R—O—C(=O)—C(=S)—NR'R", wherein R represents a monovalent organic group and R' and R" are each independently selected from hydrogen and monovalent organic groups. Herein, the monovalent organic groups can again be as defined above for the thiourea compounds. A non-limiting example of a thiooxamate includes for instance ethyl thiooxamate.

Thiocarboxylic acids and dithiocarboxylic acids are derivatives of carboxylic acids, wherein one or two oxygen atoms of the carboxyl group are replaced with a sulphur atom, respectively.

Preferably the at least one thiocarbonyl-functional compound used according to the present invention is selected from a thiourea compound, thioamide, xanthate, dithiocarbamate or a mixture or combination thereof. The thiocarbonyl-functional compound used according to the present invention may furthermore comprise sulfide functionality. The term "sulfide functionality" means that the compound comprises at least one covalently bound —S$_x$— moiety, wherein x typically ranges from 1 to 20 such as from 1 to 10 or from 1 to 4. The thiocarbonyl-functional compound used according to the present invention can in particular comprise two thiocarbonyl groups (as part of any one of the aforementioned thiocarbonyl-functional structures such as thioamides, xanthates, dithiocarbamates etc.), which are linked by a sulfide moiety —S$_x$—.

The at least one thiocarbonyl-functional compound used according to the present invention can thus for example have a structure of the formula (1):

A-C(=S)—(S)$_x$—C(=S)—B     (1).

Herein x is an integer in the range from 1 to 10, preferably being 1 or 2. The groups A and B are each independently selected from NR'R" and OR'". R', R" and R'" are each independently selected from hydrogen and monovalent organic groups, such as hydrocarbyl groups, having from 1 to 20 carbon atoms. The monovalent organic groups R', R" and R'" can e.g. comprise up to 15 carbon atoms such as from 1 to 10, from 1 to 6 or from 1 to 4 carbon atoms. They can for instance be each independently selected from alkyl, aryl, cycloalkyl or aralkyl, which may optionally be substituted by one or more than one functional group(s) such as hydroxyl, thiol or amine. Preferably R', R" and R'" are each independently selected from C$_{1-12}$ alkyl, aryl or aralkyl groups such as methyl, ethyl, iso-propyl, n-propyl, n-butyl, sec-butyl, tert-butyl, amyl, hexyl, heptyl, phenyl, benzyl, tolyl, xylyl and 2-ethyl-hexyl. Non-limiting examples of suitable compounds according to formula (1) are xanthates such as di-alkyl xanthogen di- or polysulphides, e.g. di-isopropyl xanthogen polysulphide (DIXP) or di-isopropyl xanthogen disulphide (DIDP), and thiuram sulfide compounds such as those described in more detail below.

Particularly useful as thiocarbonyl-functional compounds according to the present invention are thiuram compounds. As used herein, the term "thiuram compound" means a compound comprising at least one monovalent group of the formula R'R"N—C(=S)— covalently bound to an organic or inorganic moiety of a valency matching the number of R'R"N—C(=S)— groups per molecule. Herein the groups R' and R" each independently represent a hydrogen or a monovalent organic group covalently bound to the nitrogen atom, which can be the same or different from each other. The monovalent organic groups R' and R" can e.g. comprise up to 18 carbon atoms such as from 1 to 10, from 1 to 6 or from 1 to 4 carbon atoms. The groups R' and R" comprise hydrocarbyl groups as well as organic groups containing besides carbon and hydrogen one or more heteroatom such as oxygen, nitrogen or sulphur. The groups R' and R" can for instance be each independently selected from alkyl, aryl, cycloalkyl or aralkyl, which may optionally be substituted by one or more than one functional group such as hydroxyl, thiol or amine. Preferably R' and R" are each independently selected from C$_{1-12}$ alkyl, aryl or aralkyl groups such as methyl, ethyl, iso-propyl, n-propyl, n-butyl, sec-butyl, tert-butyl, amyl, hexyl, heptyl, phenyl, benzyl, tolyl, xylyl and 2-ethyl-hexyl. The groups R' and R" can also be replaced by a divalent organic group such as an alkylene group, which forms a ring structure together with the nitrogen atom, such as in dipentamethylene thiuram tetrasulfide.

Non-limiting examples of organic moieties to which the at least one group of the formula R'R"N—C(=S)— can be bound are $C_1$ to $C_{10}$ organic groups, which may optionally comprise one or more than one heteroatom(s) such as O, N and/or S. Non-limiting examples of inorganic moieties to which the at least one group of the formula R'R"N—C(=S)— can be bound are mono- and polysulfide moieties.

Preferably the at least one thiocarbonyl-functional compound used according to the present invention is a thiuram sulfide compound. In particular a thiuram sulfide compound having a structure of the formula (2):

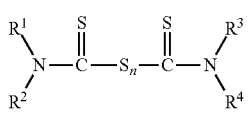

(2)

can be used. Herein n is an integer in the range from 1 to 6, preferably being 1 or 2, and $R^1$, $R^2$, $R^3$ and $R^4$ are each independently selected from hydrogen and a monovalent organic group as defined above for R' and R" with respect to thiuram compounds in general. Preferably the monovalent organic group is herein a hydrocarbyl group having from 1 to 20 carbon atoms such as from 1 to 12 carbon atoms. Most preferred $R^1$, $R^2$, $R^3$ and $R^4$ are each independently selected from hydrogen and monovalent aliphatic or aromatic groups such as alkyl groups like methyl, ethyl, propyl, isopropyl, n-butyl, tert-butyl and isobutyl or an aryl or aralkyl group such as phenyl, benzyl, xylyl, naphthyl or tolyl. The thiuram sulfide compound can in particular be a tetraalkylthiuram mono- or disulfide, a tetraalkylarylthiuram mono- or disulfide, a tetraarylalkylthiuram mono- or disulfide, a tetraarylthiuram mono- or disulfide or a mixture or combination thereof. Non-limiting examples of suitable specific thiuram sulfide compounds, which can be used according to the present invention, include tetramethylthiuram disulfide, tetraethylthiuram disulfide, tetrabutylthiuram disulfide, tetramethylthiuram monosulfide, tetraisobutylthiuram disulfide, dipentamethylenethiuram tetrasulfide, dipentamethylenethiuram hexasulfide and tetrabenzylthiuram disulfide. According to the present invention the use of tetramethylthiuram disulfide and/or tetrabenzylthiuram disulfide is particularly preferred.

It has surprisingly been found that maturing the raw polymer latex in the presence of at least one thiocarbonal-functional compound as defined above leads to the formation of matured or modified polymer latices, which make it possible to obtain cured latex films of significantly enhanced softness in combination with enhanced tensile strength and/or elongation at break, or at least without substantially degrading the achievable tensile strength and/or elongation at break. Also no undesirable odour or color characteristics were imparted by the use of the thiocarbonal-functional compound at typically used amounts. As a measure for the softness of a latex film it is referred in the context of the present invention to the modulus values $M_{300}$ and $M_{500}$, which correspond to the stress needed for reaching an elongation of 300% or 500% and may be deduced from a stress-strain curve that can be recorded using a tensiometer. Moreover, as used herein the expression "without substantially degrading the achievable tensile strength or force at break" means that the tensile strength or elongation at break, respectively, is not reduced at all or reduced by not more than 10% with respect to a latex film obtained in the same manner from a corresponding composition with a polymer latex prepared analogously, but without the maturing in the presence of a thiocarbonyl-functional compound.

Accordingly, the present invention is also directed towards the use of a thiocarbonyl-functional compound, which can be any thiocarbonyl-functional compound as described above, for example a thiuram compound, as additive to a monomer mixture comprising at least one conjugated diene and at least one ethylenically unsaturated nitrile or to a raw polymer latex formed therefrom by free-radical emulsion polymerization in an aqueous reaction medium for reducing the modulus $M_{300}$ and/or $M_{500}$ of rubber articles obtainable by curing a curable composition comprising the formed polymer latex without substantially degrading the tensile strength and/or elongation at break with respect to rubber articles obtained in the same manner from a corresponding curable composition comprising a polymer latex prepared correspondingly by free-radical emulsion polymerization, but without the use of a thiocarbonyl-functional compound.

The at least one thiocarbonyl-functional compound is generally used in an amount of at least 0.05 wt.-%, based on the total amount of monomers subjected to free-radical emulsion polymerization in step (a). For example the at least one thiocarbonyl-functional compound can be present in step (b) in an amount of at least 0.10 wt.-%, at least 0.12 wt.-%, at least 0.15 wt.-%, at least 0.18 wt.-%, at least 0.20 wt.-%, at least 0.21 wt.-%, at least 0.22 wt.-%, at least 0.23 wt.-%, at least 0.24 wt.-%, at least 0.25 wt.-%, at least 0.26 wt.-%, at least 0.27 wt.-%, at least 0.28 wt.-%, at least 0.29 wt.-%, at least 0.30 wt.-%, at least 0.32 wt.-%, at least 0.35 wt.-%, at least 0.40 wt.-% or at least 0.45 wt.-%, based on the total amount of the monomers. The at least one thiocarbonyl-functional compound can be present in step (b) in an amount of no more than 3.0 wt.-%, no more than 2.5 wt.-%, no more than 2.0 wt.-%, no more than 1.5 wt.-%, no more than 1.2 wt.-%, no more than 1.0 wt.-%, no more than 0.9 wt.-%, no more than 0.8 wt.-%, no more than 0.7 wt.-%, no more than 0.6 wt.-%, no more than 0.55 wt.-% or no more than 0.50 wt.-%, based on the total amount of the monomers. Typically the thiocarbonyl-functional compound is thus used for the maturing of the raw polymer latex in an amount of from 0.12 wt.-% to 2.0 wt.-%, preferably from 0.15 wt.-% to 1.0 wt. %, more preferably from 0.20 to 0.80 wt.-%, from 0.25 wt. % to 0.70 wt. %, from 0.25 wt. % to 0.60 wt. %, from 0.25 wt. % to 0.50, from 0.25 to 0.45 wt.-%, from 0.25 to 0.40 wt.-%, or from 0.25 to 0.35 wt.-%, based on the total amount of monomers. A person skilled in the art will appreciate that any range between any of the explicitly disclosed lower and upper limit is herein disclosed.

It has been found that latex films derived from a curable composition comprising a polymer latex matured in the presence of the at least one thiocarbonyl-functional compound in an amount as indicated above, exhibit an optimized performance in terms of mechanical properties, ageing stability and color. If the at least one thiocarbonyl-functional compound is used in amounts lower than 0.05 wt.-%, based on the total amount of monomers, no or only a slight enhancement of softness of the derived latex films can be obtained. On the other hand the use of extensive amounts of the thiocarbonyl-functional compound(s) tends to cause an undesirable yellowish color and to degrade the ageing stability of the derived latex films.

It has in particular been found that maturing the raw latex obtained by emulsion polymerization in the presence of an effective amount of the at least one thiocarbonyl-functional compound as set forth above at an elevated temperature, as described above, enhances the stability of the polymer latex versus ageing. In particular, the beneficial combination of a relatively high softness and a relatively high tensile strength and elongation at break of latex films derived from the curable polymer latex compositions according to the present invention as imparted by maturing of the raw latex in the presence of the at least one thiocarbonyl-functional compound may thus be preserved, e.g. when the films were aged for 22 hours at a temperature of 100° C. in air.

Accordingly the above-indicated use of a thiocarbonyl-functional compound as additive to a monomer mixture or raw polymer latex derived therefrom for enhancing the softness of rubber articles obtainable from a polymer latex composition without degrading their tensile strength and/or the elongation at break can advantageously comprise heat treating a mixture of the polymer latex and the added thiocarbonyl-functional compound to increase the ageing stability of the tensile properties of the polymer latex.

As a characteristic difference to the prior use of organosulfur compounds as vulcanization agents it is to be noted that the maturing according to the present invention concerns the raw polymer latex. The maturing is carried out as a separate step prior to the addition of compounding the polymer latex with sulphur and/or other cross-linking agents, if any, and a vulcanization.

The preparation of the polymer latices according to the present invention may optionally comprise further steps such as removing residual monomer from the aqueous polymer dispersion, adjusting the solids content of the aqueous polymer dispersion e.g. to 20 to 60 wt.-%, based on the total weight of the aqueous polymer dispersion and/or adjusting the pH value of the aqueous polymer dispersion by the addition of a pH modifier such as a base or acid. Such optional steps are typically carried out after the emulsion polymerization step and before subjecting the polymer latex to maturing step (b).

The obtained matured polymer latex may then further be compounded with various additives which are conventionally used in the art for forming curable polymer latex compositions from which rubber articles may be manufactured.

In particular one or more than one additional agent capable of participating in a cross-linking reaction of the polymer, also referred to herein as "cross-linking agent", can be added to the matured polymer latex of the present invention. Accordingly, curable polymer latex compositions according to the present invention may comprise a matured polymer latex prepared as set forth above and one or more than one additional cross-linking agent.

The agent capable of participating in a cross-linking reaction of the polymer comprises any substance that causes or promotes a cross-linking of the polymer latex including e.g. agents used for conventional vulcanization, which relies on the formation of covalent (poly)sulfide bridges, and other crosslinking agents, e.g. those able to react, bind or coordinate with functional groups present in the polymer latex molecules, as well as vulcanization accelerators.

The polymer latex compositions according to the present invention may thus comprise for example sulphur as vulcanization agent. If used, sulphur can in particular be comprised in an amount of 0.05 to 5.0 wt. %, preferably 0.1 to 2.0 wt. %, more preferably 0.2 to 1.5 wt. %, most preferably 0.3 to 1.0 wt. %; based on the total amount of solids of the curable polymer latex composition.

The polymer latex compositions according to the present invention may also comprise one or more than one vulcanization accelerator. The type of vulcanization accelerator is not particularly limited such that any substance conventionally used for such purpose can be used as long as it effectively accelerates the vulcanization of the polymer latices of the present invention. Suitable vulcanization accelerators can for instance be exemplified by carbamates, xanthates and amines, without being limited thereto. For example a dithiocarbamate compound such as a zinc dialkyl dithiocarbamate, e.g. zinc diethyl dithiocarbamate or zinc dibutyl dithiocarbamate, can be used as vulcanization accelerator in the polymer latex compositions according to the present invention. Further suitable substances include zinc dibenzyl dithiocarbamate, zinc pentamethylene dithiocarbamate (ZPD), diphenylguanidine (DPG), di-o-tolylguanidine (DOTG) and o-tolylbiguanidine (OTBG). If used, the one or more than one vulcanization accelerator may be comprised in the composition in an amount of 0.01 to 2.0 wt.-%, preferably 0.1 to 1.0 wt.-%, based on the total amount of solids of the curable polymer latex composition.

Alternatively or additionally to sulphur and the one or more than one vulcanization accelerator the polymer latex compositions according to the present invention may comprise a crosslinking agent capable of reacting, binding or coordinating with functional groups present in the polymer latex such as e.g. nitrile groups or acid groups, if present, in order to achieve cross-linking thereby. Non-limiting examples of such cross-linking agents are polyfunctional organic compounds such as for example poly alkoxyalkyl alkylol melamines and/or compounds of polyvalent metals. Especially the green strength of the dipped latex films may be enhanced by the use of compounds of polyvalent metal ions. Suitable examples of compounds of polyvalent metals are for instance metal oxides such as those of zinc, calcium, titanium, aluminium etc. A preferably used compound is e.g. zinc oxide. If used, the one or more than one compound of a polyvalent metal may be comprised in the polymer latex composition according to the present invention in an amount of 0.05 to 3.0 wt.-%, preferably 0.2 to 1.5 wt.-%, more preferably 0.3 to 1.2 wt.-%, most preferably 1.0±0.2 wt.-%, based on the total amount of solids of the curable polymer latex composition.

As the polymer latex according to the present invention may itself comprise cross-linking functionalities, e.g. imparted by self-cross-linking monomers as described above, that render it curable the use of additional cross-linking agent(s) is optional. Accordingly the curable polymer latex compositions of the present invention can be formed by an aqueous polymer latex composition matured in the presence of the at least one thiocarbonyl-functional compound with or without the addition of further cross-linking agents.

The curable polymer latex composition according to the present invention may furthermore comprise one or more than one component selected from pH modifiers, surfactants, protective colloids, wetting agents, thickeners, rheology modifiers, fillers, pigments, dispersants, optical brighteners, dyes, stabilizers, biocides, antifoam agents or a combination thereof, depending on the requirements of the intended application. Specific substances, which may be used as such components, and their effective amounts are known to the skilled artisan and may be selected accordingly. Suitable surfactants and protective colloids are mentioned above and can be introduced to the compositions according to the present invention within the preparation of the polymer latex and/or added thereafter. Suitable antifoam agents include for example silicone oils and acetylene glycols. Customary wetting agents include for example alkylphenol ethoxylates, alkali metal dialkylsulfosuccinates, acetylene glycols and alkali metal alkylsulfates. Typical thickeners include, without being limited thereto, polyacrylates, polyacrylamides, xanthan gums, modified celluloses or particulate thickeners, such as silicas and clays. Rheology modifiers include for example mineral oil, liquid polybutenes, liquid polyacrylates and lanolin. Frequently used fillers include minerals such as silica, calcium carbonate and clay. Suitable pigments can be exemplified by titanium dioxide ($TiO_2$) or carbon black. Suitable biocides include for example, heterocyclic chemical compounds such as substituted isothiazolinones, suitable examples include methylisothiazolinone (MIT), benzisothiazolinone (BIT), butylbenzisothiazolinone (BBIT), octylisothiazolinone (OIT), chloromethylisothiazolinone (OMIT), dichlorooctyl-isothiazolinone (DCOIT). Alternatively, or additionally 1,5-dihydroxy-2,5-dioxahexane or a hydroxymethyl ureide formaldehyde donor such as Acticide F(N)® supplied by Thor, or 2-bromo-2-nitropropane-1,3-diol (bronopol) may be used.

Depending on the intended further processing of the curable polymer latex compositions the pH value of the polymer latex composition according to the present invention may be adjusted to be in the range of 8 to 11, preferably 9 to 10.5 by use of a pH modifier. Preferred pH modifiers for use according to the present invention are for example ammonia or alkali hydroxides. The solids content of the polymer latex compositions according to the present invention can be adjusted as needed for further processing, typically by removal or addition of water.

The curable polymer latex compositions according to the present invention are particularly suitable for dip-molding processes. When used for dip molding, the polymer latex compositions of the present invention typically have pH value of 10±1 and/or a solids content in the range of 12 to 40 wt-%, preferably 15 to 30 wt-%, based on the total weight of the composition. Optionally, or additionally the thus prepared latex may be diluted to 8-12%, for use in the so-called double dipping technology. The thus compounded latex can be used typically after being de-aerated.

Furthermore the polymer latex compositions of the present invention preferably have a certain maximum electrolyte stability determined as critical coagulation concentration of for example less than 30 mmol/l $CaCl_2$, preferably less than 25 mmol/l, more preferred less than 20 mmol/l, most preferred less than 10 mmol/l (determined for a total solids content of the composition of 0.1% at pH 10 and 23° C.). If the electrolyte stability is too high it is difficult to coagulate the polymer latex in a dip-molding process with the result that either no continuous film of the polymer latex is formed on the immersed mold or the thickness of the resulting product is non-uniform. It is within the routine of the person skilled in the art to appropriately adjust the electrolyte stability of a polymer latex. The electrolyte stability will depend on different factors, for example, amount and selection of monomers to be used for making the polymer latex, especially monomers containing polar-functional groups, as well as the selection and amount of the stabilizing substances such as surface-active agents and/or protective colloids present in the composition.

Rubber articles may be prepared from the curable polymer latex compositions for, example by the above-mentioned method for making a rubber article according to the present invention. Herein, a mold having a desired shape of the final article is provided. The mold, frequently referred to also as a former, is generally made of a material that is dimensionally and chemically stable under the applied processing conditions and can be made e.g. of a suitable metallic or ceramic material, such as a corrosion-resistant metal or alloy. The mold is then immersed in a coagulant bath. As coagulant any substance that is capable of causing a coagulation of the used polymer latex composition according to the present invention can in principle be used in the bath. Typically the coagulant bath comprises a solution of a metal salt. The coagulant is usually employed as a solution in water, an alcohol or a mixture thereof. Specific non-limiting examples of metal salts suitable as coagulant include metal halides like calcium chloride, magnesium chloride, barium chloride, zinc chloride and aluminum chloride; metal nitrates such as calcium nitrate, barium nitrate and zinc nitrate; metal sulfates such as calcium sulfate, magnesium sulfate, and aluminum sulfate; and acetic acid salts such as calcium acetate, barium acetate and zinc acetate. Preferably used in the method according to the present invention are calcium chloride and/or calcium nitrate, typically at a concentration of 15-20 wt.-%, preferably 18±1 wt.-%, based on the total weight of the coagulant bath. The coagulant solution may optionally contain auxiliary additives to improve for example the wetting behaviour of the mold, or a release agent such as salts of fatty acids like calcium stearate. The coagulant solution temperature is typically maintained at 50-60° C. The mold is then removed from the coagulant bath and may optionally be dried. Typically, the former is cleaned and warmed to 70° C., and slowly dipped in to the coagulant solution and held for about 1 second, before removing and optionally drying e.g. at 40° C. for about 2 minutes in an oven, after removal of any excess coagulant drips.

The thus treated mold is then immersed in a curable polymer latex composition according to the present invention as described in detail above. Typically the former temperature does not exceed 65° C. as it enters in to the polymer latex composition. Thereby a thin film of latex coagulates on the surface of the mold. It is possible to adjust the film thickness by the number of such dipping steps applied. Accordingly the latex film may be obtained by a single immersion into the curable polymer latex composition or by a plurality of such dipping steps, for example two dipping steps, in sequence (this is known as the double dipping technology). The time taken to immerse the mold, together with the dwell time in the curable latex composition and the time taken to withdraw the mold influences the thickness of the coagulated coating. Typical values for this process are about 7 seconds traversing into the latex composition, about 3-5 seconds dwell time and about 7 seconds to withdraw the mold from the curable latex composition. Thereafter the mold is removed from the latex composition and optionally immersed in an aqueous cleaning bath in order to extract, for example, polar components from the composition and to wash the coagulated latex film. The aqueous cleaning bath typically is a water bath. The mold may e.g. be removed from the latex composition and allowed to gel for about 1 minute at a temperature of 25-40° C. for example, before leaching with water for 1 minute at about 60° C. by immersing it in an aqueous cleaning bath. The latex coated mold may furthermore optionally be dried, preferably after immersion in an aqueous cleaning bath. Thereafter the cuff of the glove is typically manually rolled up or 'beaded' and the mold is dried. Drying of the thus coated mold may e.g. be performed in a hot air or hot air circulating oven, typically in a 2-stage process, first at a temperature of between 70 and 95° C., preferred about 90° C., for about 10 minutes, and then cured at a temperature of 100-130° C., preferred about 120° C., for about 20 minutes.

The latex coated mold is then heat treated at a temperature in the range of 80° C. to 200° C., preferably 100° C. to 180° C., to cure the latex and thus obtain a rubber article with the desired mechanical properties. The duration of the heat treatment will depend on the temperature and is typically between 1 and 60 minutes. The higher the temperature the shorter is the required treatment time. The formed rubber article is then removed from the mold. As used herein curing refers to cross-linking the polymer latex to form a rubber material with elastic properties. Accordingly, curable means the ability to be cured.

In a specific variant of the afore-mentioned method a removable liner that conforms to the shape of the mold is disposed on the mold prior to immersing the mold in the coagulant bath. The formed latex article then comprises the removable liner. Accordingly, the rubber articles according to the present invention may generally comprise a substrate being coated or impregnated with the polymer latex composition according to the present invention as at least partially cured. The substrate or liner preferably comprises a textile material.

Rubber articles according to the present invention may thus in particular comprise a self-supporting film or a supported film made from a curable polymer latex composition according to the present invention. The film thickness for the unsupported films such as for gloves typically ranges from 0.02 to 0.08 mm, preferably from 0.03 to 0.07 mm, such as from 0.03-0.06 mm or 0.03-0.05 mm, whilst that for supported films can be up to 5 mm.

The finally obtained cured polymer latex film typically exhibits one or more than one, such as all, of the following mechanical properties:
 a tensile strength of at least 20 MPa, preferably at least 25 MPa, or at least 30 MPa, or at least 35 MPa, or at least 38 MPa, or at least 40 MPa;
 an elongation at break of at least 300%, preferably at least 350%, or at least 400%, or at least 450%, or at least 500%, or at least 550%;
 a modulus $M_{300}$ and/or $M_{500}$ being at least 10%, preferably at least 20%, at least 25% or at least 30% lower than for a film obtained in the same manner from a corresponding curable polymer latex composition, but without maturing in the presence of a thiocarbonyl-functional compound. The modulus $M_{300}$ can for example be less than 10 MPa, preferably less than 9 MPa, less than 8 MPa, or less than 7 MPa for the polymer latex films according to the present invention. The modulus $M_{500}$ can for example be less than 35 MPa, or less than 30 MPa, or less than 28 MPa, or less than 25 MPa for the polymer latex films according to the present invention.

These mechanical properties can be retained also after ageing at conditions typically encountered in a product life cycle of the respective type of rubber product and ageing conditions simulating the same such as in an accelerated ageing test, e.g. exposing the latex film sample to a temperature of 100° C. for 22 hours in an air circulating oven. The terms "stable upon ageing", "ageing stability" or the like as used to herein, do not necessarily mean that the properties of the latex or film derived therefrom do not change upon ageing. In fact the properties such as e.g. mechanical properties of the latex films may change to some extent upon ageing, for example the latex films may become stiffer. However the latex films according to the present invention will generally retain in the aged state a relatively higher softness and at least comparable tensile strength and/or elongation at break with respect to reference aged reference latex films obtained from a corresponding curable polymer latex composition, wherein the raw latex was not subjected to maturing in the presence of a thiocarbonyl-functional compound. Retention of such favourable combination of properties according to the present invention relative to the reference latex films is also covered by the meaning of the terms "stable upon ageing", "ageing stability" or the like as used to herein.

The mechanical properties mentioned herein generally refer to the respective mechanical properties as determined according to ASTM D412-06a. Details on the measurement of the mechanical properties are set forth below in the experimental section.

The curable polymer latex composition according to the present invention can in particular be used for the manufacture of dip molded articles and/or for coating and impregnating a substrate, applying for example a process as described beforehand.

The present invention is especially applicable for the production of rubber articles such as gloves, in particular surgical gloves, examination gloves, industrial gloves and household gloves, condoms and catheters.

The mechanical properties attainable by the use of polymer latices according to the present invention combining in particular an enhanced softness with a high tensile strength, basically retained also upon ageing, are considered to enable effectively reducing the film thickness of such rubber articles without adversely affecting the application performance.

The present invention will be further illustrated with reference to the following examples. The scope of the present invention is however by no means limited to these examples and rather has to be construed in view of the appended claims in the light of the description with due consideration of the doctrine of equivalents.

EXAMPLES

Preparation of Aqueous Polymer Dispersions by Free-Radical Emulsion Polymerization Example 1 (Comparative Example)

74.7 parts by weight of water and 2.0 parts by weight (based on polymer solids) of a seed latex (z-average particle size 36 nm, measured using a Malvern Zetasizer Nano S (ZEN 1600)® using Dynamic Light Scattering (DLS)) having a solids content of 31 wt.-% were added to a nitrogen-purged autoclave and subsequently heated to 25° C. Then 0.05 parts by weight of sodium salt of C10-13 alkylbenzenesulfonic acid (parts by weight based on solids; an aqueous solution with a total solids content (TSC) of 25 wt.-% TSC was employed), 0.01 parts by weight of tetra sodium ethylendiamine tetraacetate ($Na_4EDTA$), 0.05 parts by weight of Bruggolite® FF6 (supplied by Bruggemann Chemical), 0.005 parts by weight of ferrous sulfate and 0.08 parts by weight of cumene hydroperoxide (CHP) were added thereto.

A separate feed comprising the delayed monomer charge was prepared by mixing together 30 parts by weight acrylonitrile, 62 parts by weight butadiene, 6 parts by weight methacrylic acid and 0.58 parts by weight t-dodecylmercaptan (tDDM), and added to the aqueous medium in the autoclave at a constant rate over a period of 5 hours.

Starting simultaneously with the monomer feed, a mixture of 2.5 parts by weight of sodium salt of C10-13 alkylbenzenesulfonic acid (parts by weight based on solids, an aqueous solution with a TSC of 25% was used), 0.25 parts by weight of a mixture of Disodium Mono- and Didodecyl Diphenyloxide Disulfonates (parts by weight based on solids; an aqueous solution with a TSC of 45% was used), 0.2 parts by weight of tetra sodium pyrophosphate and 14.93 parts by weight water were added to the aqueous medium in the autoclave over a period of 10 hours.

Starting simultaneously with the above feeds, moreover, a co-activator feed of 0.15 parts by weight Bruggolite® FF6 in 3.1 parts by weight water was added over a period of 14 hours.

A post activation feed of 0.08 parts by weight of CHP and 0.05 parts of sodium salt of C10-13 alkylbenzene sulfonic acid (parts by weight based on solids, an aqueous solution with a TSC of 25% was used) in 5.22 parts by weight water was injected after 10 hours from the commencement of the above feeds.

The temperature of the aqueous medium in the autoclave was maintained at 25° C. for 2 hours beginning from the addition of the monomer charge, cooled down to 20° C. over 1 hour, and maintained at this temperature for 13 hours. Then the temperature was increased to 30° C. over 4 hours and maintained at 30° C. until a monomer conversion of approximately 98%, based on the total amount of monomers, was reached, resulting in a total solid content of the thus formed aqueous polymer dispersion of approximately 45 wt.-%. The degree of monomer conversion was estimated from the elapsed reaction time by comparison to a known reaction profile obtained by sampling the batch at defined elapsed reaction times and measuring the degree of monomer conversion at these defined times.

The polymerization was then stopped by addition of 0.2 parts by weight of solid sodium dithionite in water, based upon 100 parts of total weight of monomers charged.

The pH of the obtained aqueous polymer dispersion was then adjusted using ammonium hydroxide solution to pH 7.5, and residual monomers and other volatile organic compounds were removed from the aqueous polymer dispersion by vacuum distillation down to a pressure of 100 mbar at 60° C. The thus stripped latex was decanted from the stripping vessel and allowed to cool to room temperature in a ventilated fume cupboard. Subsequently, 0.5 parts by weight of a Wingstay L type antioxidant (60% dispersion in water) was added to the raw latex and the pH was adjusted to 8.2 by addition of ammonium hydroxide solution.

Example 2 (Comparative Example)

A portion of the final polymer latex obtained from Example 1 was additionally heated to a temperature of 60° C., and maintained at this temperature for 900 minutes.

Example 3 (Comparative Example)

A polymer latex was prepared as described in Example 1 and subsequently heated to a temperature of 60° C., and maintained at this temperature for 1620 minutes.

Example 4 (Comparative Example)

A polymer latex was prepared as described in Example 1 and subsequently heated to a temperature of 80° C., and maintained at this temperature for 60 minutes.

Example 5

A polymer latex was prepared as described in Example 1. 0.3 parts by weight of solid tetramethylthiuram disulfide (TMTD) per 100 parts by weight of total monomers charged were added as a dispersion prepared as described below in the context of Example 7 to this aqueous polymer dispersion immediately prior to compounding.

Example 6

A polymer latex was prepared as described in Example 1. 0.3 parts by weight of solid tetramethylthiuram disulfide (TMTD) per 100 parts by weight of total monomers charged were added as a dispersion prepared as described below in the context of Example 7 to this aqueous polymer dispersion. The obtained mixture was then allowed to mature at room temperature for 60 minutes prior to compounding.

Example 7

A portion of the final latex of Example 1 was heated to a temperature of 60° C. in a jacketed glass reactor, temperature control being maintained using PT100 temperature sensors connected to a temperature control system incorporating a fluid bath reservoir (supplied by Julabo GmbH). 0.3 parts by weight of solid tetramethylthiuram disulfide (TMTD) per 100 parts by weight of total monomers charged were added as a dispersion prepared as set forth below to the heated latex under stirring. The agitator used was a PTFE-coated anchor, attached to an overhead stirrer via a PTFE stirrer gland, rotating at 100 rpm. The thus obtained polymer latex comprising the added TMTD dispersion was maintained at the temperature of 60° C. for 5 minutes. The thus treated latex was then discharged from the glass reactor via a base valve and allowed to cool to room temperature.

The added TMTD dispersion was supplied by Revertex Malaysia Sdn Bhd as 50 wt.-% TMTD Dispersion. This dispersion was produced using a comminuting system, providing 463 parts by weight of deionised water to a suitable mixing vessel, into which was dissolved 15 parts by weight of a condensed naphthalene sulphonate (such as Dehscofix® 153, supplied by Air Products) and 1 part by weight of a non-ionic wetting agent (such as Surfynol® TG). Into this mixture was added, 500 parts by weight TMTD powder, 5 parts by weight of Bentonite clay, 15 parts by weight of potassium hydroxide and 1 part by weight of benzisothiazolinone. This mixture was then milled on a suitable mill, such as a Coball Mill, Siverson stirrer, Ball mill or Horizontal mill rotating at 3000 rpm for at least 30 minutes, or until a maximum particle size of 50 microns was achieved. The viscosity of the obtained dispersion is typically 200-500 mPas measured using a Brookfield LVT Spindle 2/60 rpm (in accordance with ISO 1652), the pH is typically 9.0-11.0 and the total solids content is between 50.0 and 52.0 wt.-%.

Example 8

A polymer latex comprising added TMTD was prepared and heat treated as described in Example 7 with the difference that the latex comprising the added TMTD dispersion was maintained at 60° C. for 60 minutes.

Example 9

A polymer latex comprising added TMTD was prepared and heat treated as described in Example 7 with the difference that the latex comprising the added TMTD dispersion was maintained at 60° C. for 900 minutes.

Example 10

A polymer latex was prepared as described in Example 1. A polymer latex comprising added TMTD was prepared therefrom and heat treated as described in Example 7 with the difference that the latex comprising the added TMTD dispersion was maintained at 60° C. for 1620 minutes.

Example 11

A polymer latex comprising added TMTD was prepared and heat treated as described in Example 7 with the difference that the latex was heated to a temperature of 40° C. and was maintained at 40° C. for 5 minutes after addition of the TMTD dispersion.

Example 12

A polymer latex comprising added TMTD was prepared and heat treated as described in Example 11 with the difference that the latex comprising the added
TMTD dispersion was maintained at 40° C. for 60 minutes.

Example 13

A polymer latex comprising added TMTD was prepared and heat treated as described in Example 11 with the difference that the latex comprising the added TMTD dispersion was maintained at 40° C. for 900 minutes.

Example 14

A polymer latex was prepared as described in Example 1. A polymer latex comprising added TMTD was prepared therefrom and heat treated as described in Example 7 with the difference that the latex was heated to a temperature of 80° C. for addition of the TMTD dispersion and the mixture was maintained at 80° C. for 60 minutes after addition of the TMTD dispersion.

Furthermore, polymer latices were prepared as follows with varying amounts of TMTD added.

Example 15 (Comparative Example)

A polymer latex was prepared as described in Example 1 with the difference that following the addition of the short stop and the pH adjustment, the latex was heated to a temperature of 60° C. and maintained at this temperature for 210 minutes before the removal of the residual monomers by vacuum distillation.

Example 16 (Comparative Example)

A polymer latex was prepared as described in Example 15 with the difference that following the addition of the short stop and the pH adjustment additionally 0.03 parts by weight of solid TMTD were added as a dispersion (prepared as described above) to the latex. The resulting mixture was then heated to a temperature of 60° C. and maintained at this temperature for 210 minutes before the removal of the residual monomers by vacuum distillation.

Example 17

A polymer latex was prepared as described in Example 16 with the difference that 0.20 parts by weight of solid TMTD were added in the form of the dispersion.

Example 18

A polymer latex was prepared as described in Example 16 with the difference that 0.30 parts by weight of solid TMTD were added in the form of the dispersion.

Example 19

A polymer latex was prepared as described in Example 16 with the difference that 0.50 parts by weight of solid TMTD were added in the form of the dispersion.

Example 20

A polymer latex was prepared as described in Example 16 with the difference that 0.80 parts by weight of solid TMTD were added in the form of the dispersion.

Example 21

A polymer latex was prepared as described in Example 16 with the difference that 1.00 parts by weight of solid TMTD were added in the form of the dispersion.

Moreover polymer latices were prepared as described in the following using different kinds of organosulfur compounds as additive for the heat treatment.

Example 22 (Comparative Example)

A polymer latex was prepared as described in Example 1 and subsequently heated to a temperature of 60° C., and maintained at this temperature for 900° C. minutes.

Example 23

A polymer latex was prepared as described in Example 1. A polymer latex comprising added TMTD was prepared therefrom and heat treated as described in Example 7 with the difference that the latex comprising the added TMTD dispersion was maintained at 60° C. for 900 minutes.

Example 24

A polymer latex comprising added thiocarbonyl-functional compound was prepared and heat treated as described in Example 23 with the difference that TMTD was replaced by tetrabenzylthiuram disulfide (TBzTD), supplied by Performance Additives (Behn Meyer Group) as Perkacit® TBzTD. Thus 0.3 parts by weight of solid TBzTD per 100 parts by weight of charged monomers were added as an aqueous dispersion to the latex heated to a temperature of 60° C. The thus obtained mixture was maintained at the temperature of 60° C. for 900 minutes following the addition of the TBzTD dispersion. The used TBzTD dispersion was prepared as the TMTD dispersion set forth in Example 7 except that TMTD was replaced by tetrabenzylthiuram disulfide (TBzTD).

Example 25

A polymer latex comprising added thiocarbonyl-functional compound was prepared and heat treated as described in Example 23 with the difference that TMTD was replaced by di-isopropyl xanthogen disulphide (DIXD), supplied by Robinson Brothers as DIXD. Thus 0.3 parts by weight of solid DIXD per 100 parts by weight of charged monomers were added as an aqueous dispersion to the latex heated to a temperature of 60° C. The thus obtained mixture was maintained at the temperature of 60° C. for 900 minutes following the addition of the DIXD dispersion. The used DIXD dispersion was prepared as the TMTD dispersion set forth in Example 7 except that TMTD was replaced by di-isopropyl xanthogen disulphide (DIXD).

Example 26

A polymer latex comprising added thiocarbonyl-functional compound was prepared and heat treated as described in Example 23 with the difference that TMTD was replaced by di-isopropyl xanthogen polysulphide (DIXP), supplied by Robinson Brothers as Robac® AS100. Thus 0.3 parts by weight of DIXP per 100 parts by weight of charged monomers were added as an aqueous dispersion to the latex heated to a temperature of 60° C. The thus obtained mixture was maintained at the temperature of 60° C. for 900 minutes following the addition of the DIXP dispersion. The used DIXP dispersion was prepared by mixing a 3 wt. % aqueous solution of Triton® CF10 (supplied by the Dow Chemical Company) into liquid DIXP supplied by Robinson Brothers Ltd. to yield an aqueous 60 wt. % DIXP dispersion.

Example 27 (Comparative Example)

A polymer latex comprising added organosulfur compound was prepared and heat treated as described in Example 23 with the difference that TMTD was replaced by N-tert-butyl-2-benzothiazyl sulfenamide (TBBS)), supplied by (Behn Meyer Group) as Linkwell TBBS (originally from Linkwell Rubber Co. Ltd). Thus 0.3 parts by weight of TBBS per 100 parts by weight of charged monomer were added as an aqueous dispersion to the latex heated to a temperature of 60° C. The thus obtained mixture was maintained at the temperature of 60° C. for 900 minutes following the addition of the TBBS dispersion. The used TBBS dispersion was prepared as the TMTD dispersion set forth in Example 7 except that TMTD was replaced by TBBS.

Compounding

The polymer latices prepared as set forth above were each compounded with 1.0 parts by weight of zinc oxide, 0.8 parts by weight of sulfur, 0.7 parts by weight of zinc diethyl dithiocarbamate (ZDEC) and 1.0 parts by weight of titanium dioxide per 100 parts by weight of polymer solids to form respective curable polymer latex compositions. For compounding each of these curative chemicals (zinc oxide, sulphur, ZDEC and titanium dioxide) was used as a 50-51 wt.-% dispersion in water as supplied by Revertex (Malaysia) Sdn. Bhd. The weighing out of the components to be compounded was carried out using a Sartorius Balance (model ED3202S).

Each of the curative chemicals was homogenised using a Silverson L5M high shear mixer with speed set at 2,500 rpm for 20 minutes before addition to the respective aqueous polymer dispersion. Each of the curative chemicals was slowly added at a temperature of 25° C. to the respective aqueous polymer dispersion under agitation, using an IKA RW20 (from IKA Labortechnik) at 120 rpm.

Following the addition of the curative chemicals, the pH of the compounded composition was adjusted to pH 10.0 using 5 wt.-% aqueous potassium hydroxide solution and a pH meter from HANNA model pH211.

The compounded polymer latex compositions were then diluted with deionised water to a total solids content of 18 wt.-%.

The compounded composition was then kept at room temperature for 16 hours under agitation with a speed set at 100 rpm.

Glove Preparation

Gloves were made from the prepared curable polymer latex compositions using an in-house designed mold dipping machine, manufactured by Kendek Industry Sdn. Bhd. according to the following procedure:

A glove mold with textured fingers and smooth palm which was produced by Ceramtec Malaysia, model HCT SR40FF was provided. The mold was first washed with domestic washing up liquid solution before rinsing off with deionised water. The thus cleaned mold was then heated to a temperature in the range of 55 to 60° C. in an oven (model UT6200, supplied by Heraeus Instruments) and subsequently dipped into a coagulant bath (18 wt.-% aqueous solution of calcium nitrate) held at a temperature of 60° C.) for a period of 1 second.

The mold removed from the coagulant bath was then placed in an oven set at 75° C. for 15 minutes. Subsequently the heated mold, which exhibited a temperature in the range of 55 to 65° C., was dipped into the respective curable polymer latex composition with the mold traversing down into the compounded latex until reaching the desired level (cuff level) within 7 seconds, maintaining that position for 5 seconds, followed by moving up out of the polymer latex composition again within 7 seconds. The thus obtained coated mold was then dried in air at room temperature (25° C.) for 1 minute and then leached in water for 1 minute at 60° C. After leaching, the gloves cuff was beaded manually. Thereafter, the coated mold was dried in an oven (model UT6200, supplied by Heraeus Instruments) at 90° C. for 10 minutes. Subsequently the coated mold was heated in an oven (model UT6200, supplied by Heraeus Instruments) to a temperature of 120° C. for a period of 20 minutes for curing of the respective curable polymer latex composition on the mold. The curing process was carried out on a maximum of 14 molds at a time.

Finally the thus formed cured latex gloves were manually stripped from the mold. The film thickness (mm) of the formed gloves was measured using a thickness gauge (supplied by Sylvac, model Studenroth, type 12.5 mm/0.001). The measured film thickness was typically in the range of 0.050-0.060 mm.

Latex Film Properties

Samples of the thin latex films were cut from the prepared cured gloves for investigation of their tensile properties and colour characteristics in un-aged state and an aged state. Ageing was achieved by placing the sample for 22 hours in an air circulating oven maintained at a temperature of 100° C. The un-aged samples as well as the aged samples were conditioned at 23±2° C. and 50±5% relative humidity for at least 24 hours prior to testing.

The tensile properties were tested according to the ASTM D412-06a test procedure using 6 mm type C dumbbell specimens for tensile tests. The cutter dimension is the same as type D from ASTMD412-06a standard, with a typical film thickness of 0.054-0.060 mm±0.002 mm cut from the palm area of the gloves. A Zwick Roell Z005 TN Proline tensiometer fitted with a longstroke extensometer was used to record the tensile stress-elongation curves. The samples were extended at a rate of 500 mm/minute, at a temperature of 23±2° C., and a relative humidity of 50±5%. The reported tensile strength corresponds to the determined maximum tensile stress in stretching the specimen to rupture. The ultimate elongation corresponds to the elongation at which rupture occurs. The reported modulus values $M_{100}$, $M_{300}$ and $M_{500}$ correspond to the determined stress needed for reaching an elongation of 100%, 300% or 500%, respectively. The quoted results represent the average of 13 test specimens.

Furthermore, the colorimetric properties of the prepared thin latex films were determined by measuring the tristimulus values L*, a* and b* using a Konica Minolta Color Reader CR-10 colorimeter calibrated with a CR-A43 white calibration plate. For each sample three point measurements were taken at different spots in the palm area of the respective glove. The reported values each represent the arithmetic average of the three measurements taken at different locations of the respective sample. Positive b* values indicate a yellowness, which is more pronounced the higher the b* value.

The results of the tests for Examples 1-14 are summarized in Table 1.

TABLE 1

Latex film properties for films derived from polymer latices according to Examples 1-14

| Latex | maturing | TS [MPa] | EB % | $M_{100}$ [MPa] | $M_{300}$ [MPa] | $M_{500}$ [MPa] | b* |
|---|---|---|---|---|---|---|---|
| Ex. 1 (Comp. Ex.) | none | Un-aged: 40.5 | 536 | 3.5 | 8.5 | 31.7 | −1.9 |
| | | aged: 43.4 | 508 | 3.9 | 9.4 | 40.6 | +3.2 |
| Ex. 2 (Comp. Ex.) | 60° C., 900 min | Un-aged: 40.4 | 541 | 3.2 | 7.4 | 30.3 | −2.0 |
| | | aged: 42.2 | 484 | 4.1 | 10.3 | 43.1 | +3.6 |
| Ex. 3 (Com. Ex.) | 60° C., 1620 min | Un-aged: 44.8 | 571 | 3.6 | 8.5 | 30.1 | n/a |
| | | aged: 47.9 | 545 | 4.1 | 10.3 | 37.5 | n/a |
| Ex. 4 (Comp. Ex.) | 80° C., 60 min | Un-aged: 42.9 | 565 | 3.4 | 7.6 | 26.5 | n/a |
| | | aged: 43.0 | 516 | 2.9 | 10.7 | 40.4 | n/a |
| Ex. 5 | Room temperature, TMTD added just prior to compounding | Un-aged: 41.8 | 612 | 3.0 | 6.4 | 18.3 | n/a |
| | | aged: 43.8 | 577 | 3.8 | 9.3 | 33.3 | n/a |
| Ex. 6 | Room temperature, 60 min | Un-aged: 43.1 | 610 | 3.1 | 6.9 | 20.3 | n/a |
| | | aged: 50.1 | 586 | 3.7 | 8.7 | 30.1 | n/a |
| Ex. 7 | 60° C., 5 min | Un-aged: 43.4 | 590 | 3.0 | 6.5 | 22.6 | −0.8 |
| | | aged: 44.6 | 558 | 3.3 | 7.7 | 31.2 | +1.9 |
| Ex. 8 | 60° C., 60 min | Un-aged: 43.7 | 583 | 3.1 | 6.8 | 22.7 | −0.5 |
| | | aged: 44.5 | 548 | 3.3 | 7.5 | 28.4 | +3.3 |
| Ex. 9 | 60° C., 900 min | Un-aged: 39.6 | 589 | 2.8 | 5.9 | 18.2 | −0.6 |
| | | aged: 40.3 | 531 | 3.4 | 8.0 | 31.5 | +3.6 |
| Ex. 10 | 60° C., 1620 min | Un-aged: 43.5 | 617 | 3.2 | 6.9 | 19.2 | n/a |
| | | aged: 48.4 | 623 | 3.5 | 7.7 | 22.7 | n/a |
| Ex. 11 | 40° C., 5 min | Un-aged: 40.6 | 586 | 2.9 | 6.2 | 19.8 | −1.3 |
| | | aged: 41.4 | 546 | 3.3 | 7.9 | 31.2 | +1.6 |
| Ex. 12 | 40° C., 60 min | Un-aged: 41.9 | 570 | 3.0 | 6.3 | 19.8 | −1.1 |
| | | aged: 46.7 | 562 | 3.2 | 7.3 | 28.9 | +2.5 |
| Ex. 13 | 40° C., 900 min | Un-aged: 43.2 | 591 | 2.8 | 5.8 | 18.3 | −1.5 |
| | | aged: 41.4 | 551 | 3.5 | 8.2 | 34.2 | +2.2 |
| Ex. 14 | 80° C., 60 min | Un-aged: 41.0 | 614 | 2.8 | 5.7 | 16.1 | n/a |
| | | aged: 44.3 | 538 | 3.6 | 8.7 | 33.3 | n/a | n/a: not available

These test results show that maturing a polymer latex in the presence of TMTD prior to compounding yields latex films with significantly enhanced softness (indicated by lower $M_{300}$ and $M_{500}$ values) and higher elongation at break as compared to films obtained from the same latex, but without maturing in the presence of TMTD, while the tensile strength remains comparable. This is found for un-aged as well as aged films. Although the films become stiffer, the favourable combination of tensile properties is retained at least to some extent upon ageing. As evident from the experimental data of Table 1 these effects are achieved most efficiently, if the maturing of the polymer latex is conducted at an elevated temperature and/or for a period of time such as about 60 minutes. For instance Example 5 shows that the addition of TMDT immediately prior to the compounding is not as effective as the latex films lose their softness upon ageing significantly more pronounced than corresponding samples, wherein the latex was allowed to mature for longer time in the presence of TMTD prior to the compounding (Examples 6-14). It was found that the films obtained from polymer latices matured in the presence of 0.3 parts by weight of TMTD per 100 parts by weight of monomers charged according to the present invention did not exhibit more yellowishness than the reference films obtained without the use of TMTD. As valid for all investigated samples according to the present invention the odour as perceived by humans in a sniff test was comparable to the corresponding reference samples obtained without maturing in the presence of a thiocarbonyl-functional compound.

The test results obtained for latex films derived from the polymer latices according to Examples 15-21 are shown in Table 2.

TABLE 2

Latex film properties for films derived from polymer latices according to Examples 15-21

| Latex | amount TMTD (pbw) | TS [MPa] | EB % | $M_{100}$ [MPa] | $M_{300}$ [MPa] | $M_{500}$ [MPa] | L* | b* |
|---|---|---|---|---|---|---|---|---|
| Ex. 15 (Comp. Ex.) | 0 | Un-aged: 46.6 | 568 | 3.0 | 7.0 | 28.1 | 83.1 | −3.9 |
| | | aged: 46.6 | 524 | 3.7 | 8.7 | 39.6 | 92.0 | −1.0 |
| Ex. 16 (Comp. Ex.) | 0.03 | Un-aged: 42.1 | 570 | 2.9 | 6.6 | 27.8 | 93.2 | −3.9 |
| | | aged: 40.4 | 530 | 3.4 | 7.9 | 33.9 | 92.1 | −1.5 |
| Ex. 17 | 0.20 | Un-aged: 42.9 | 584 | 2.8 | 6.1 | 21.4 | 93.2 | −3.9 |
| | | aged: 43.0 | 578 | 3.0 | 6.7 | 22.6 | 92.2 | −2.3 |
| Ex. 18 | 0.30 | Un-aged: 43.8 | 590 | 2.8 | 6.1 | 21.7 | 93.1 | −3.8 |
| | | aged: 45.1 | 584 | 3.1 | 7.0 | 23.6 | 92.1 | −2.1 |
| Ex. 19 | 0.50 | Un-aged: 43.3 | 592 | 2.7 | 6.1 | 22.3 | 93.0 | −3.0 |
| | | aged: 41.4 | 562 | 3.3 | 7.4 | 27.4 | 91.8 | −2.0 |
| Ex. 20 | 0.80 | Un-aged: 41.9 | 582 | 2.8 | 6.1 | 22.2 | 92.9 | −2.3 |
| | | aged: 43.5 | 561 | 3.1 | 7.1 | 26.7 | 91.8 | −1.0 |
| Ex. 21 | 1.00 | Un-aged: 46.7 | 589 | 2.8 | 5.9 | 21.7 | 92.8 | −2.0 |
| | | aged: 43.6 | 562 | 3.2 | 7.2 | 27.4 | 91.7 | −1.3 |

The data of Table 2 indicate that a significant enhancement of the film softness (as indicated by low $M_{300}$ and $M_{500}$ values) is achieved, if the TMTD is added in an amount of greater than 0.03 parts by weight (such as 0.20 parts by weight or more) per 100 parts by weight of monomers charged. At a TMTD amount of 0.03 parts by weight per 100 parts by weight of monomers charged, the film softness is increased only to a minor extent (Example 16). If the TMTD is used in amounts of equal to or greater than 0.50 parts by weight per 100 parts by weight of monomers charged the tensile properties were found to be less stable upon ageing and the color of the film shows a tendency towards a more yellowish appearance (indicated by lower L* value and less negative b* value). Therefore the optimum level of TMTD is considered to be in the range of about 0.05 parts by weight to less than 0.50 parts by weight per 100 parts by weight of monomers charged.

The test results obtained for latex films derived from the polymer latices according to Examples 22-27 are shown in Table 3.

TABLE 3

Latex film properties for films derived from polymer latices according to Examples 22-27

| Latex | organosulfur additive | TS [MPa] | EB % | $M_{100}$ [MPa] | $M_{300}$ [MPa] | $M_{500}$ [MPa] |
|---|---|---|---|---|---|---|
| Ex. 22 (Comp. Ex.) | none | Un-aged: 39.0 | 589 | 3.0 | 6.5 | 20.3 |
| | | aged: 40.6 | 554 | 3.5 | 8.5 | 30.3 |
| Ex. 23 | TMTD | Un-aged: 38.7 | 621 | 3.0 | 6.1 | 15.9 |
| | | aged: 39.8 | 600 | 3.0 | 6.5 | 18.5 |
| Ex. 24 | TBzTD | Un-aged: 39.2 | 620 | 2.8 | 5.8 | 15.9 |
| | | aged: 38.6 | 592 | 3.0 | 6.3 | 18.3 |
| Ex. 25 | DIXD | Un-aged: 41.7 | 603 | 3.1 | 6.7 | 19.1 |
| | | aged: 37.1 | 567 | 3.3 | 7.3 | 24.3 |
| Ex. 26 | DIXP | Un-aged: 39.6 | 613 | 2.9 | 6.1 | 16.5 |
| | | aged: 41.9 | 558 | 3.5 | 8.0 | 28.3 |
| Ex. 27 (Comp. Ex.) | TBBS | Un-aged: 35.4 | 596 | 2.9 | 6.0 | 17.2 |
| | | aged: 34.1 | 568 | 3.2 | 6.6 | 19.6 |

These results demonstrate that other thiuram compounds like TBzTD gave very similar performance compared to TMTD when used as thiocarbonyl-functional additive according to the present invention. The xanthogen sulphide compounds DIXD and DIXP can likewise be used as an additive to enhance the softness of the resulting latex films without substantially degrading the tensile strength, nevertheless they were found to be not as efficient in enhancing the softness as the thiuram compounds. Without intending to be bound by any theory, it is believed that the DIXD and DIXP developed a denser sulfur network and higher proportion of polysulfidic crosslinks and so resulted in higher (i.e. stiffer) modulus values than the thiuram compounds. The use of TBBS resulted in an enhancement of the film softness comparable to the use of the thiuram and xanthate compounds, however, in contrast to the thiocarbonyl-functional compounds the tensile strength is reduced at the same time. This shows that the use of non-thiocarbonyl functional organosulfur additives such as TBBS does not lead to the favourable combination of properties achievable by the present invention.

What is claimed is:

1. A method for making a curable polymer latex composition, the method comprising:
    (a) subjecting a monomer mixture comprising:
        i. at least one conjugated diene;
        ii. at least one ethylenically unsaturated nitrile;
        iii. optionally at least one ethylenically unsaturated acid;
        iv. optionally at least one further ethylenically unsaturated compound different from any of the compounds (i)-(iii);
    to free-radical emulsion polymerization in an aqueous reaction medium to form a raw polymer latex,
    (b) adding at least one thiocarbonyl-functional compound to the raw polymer latex after termination of the polymerization reaction, and allowing the raw polymer latex to mature in the presence of the at least one thiocarbonyl-functional compound at a temperature of at least 35° C., wherein the at least one thiocarbonyl-functional compound is present in an amount of at least 0.05 wt.-%, based on total amount of monomers subjected to the free-radical emulsion polymerization in step (a), and
    (c) optionally compounding the matured polymer latex with one or more cross-linking agent.

2. The method according to claim 1, wherein the raw polymer latex is allowed to mature in the presence of the at least one thiocarbonyl-functional compound in step (b) for a duration of at least 3 minutes.

3. The method according to claim 1, wherein the obtained polymer latex is allowed to mature in the presence of the at least one thiocarbonyl-functional compound in step (b) at a temperature in the range of 40° C. to 90° C.

4. The method according to claim 1, wherein the at least one thiocarbonyl-functional compound is selected from thioketones, thioaldehydes, thioureas, thioamides, xanthates, thiocarbamates, dithiocarbamates, thiosemicarbazides, trithiocarbonates, thiooxamates, thiocarboxylic acids, dithiocarboxylic acids and mixtures or combinations of any of the foregoing.

5. The method according to claim 1, wherein the at least one thiocarbonyl-functional compound has a structure of the formula:

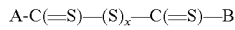

wherein x is an integer in the range from 1 to 10, and A and B are each independently selected from NR'R" and OR''', wherein R', R" and R''' are each independently selected from hydrogen and monovalent organic groups having from 1 to 20 carbon atoms.

6. The method according to claim 1, wherein the at least one thiocarbonyl-functional compound comprises a thiuram sulfide compound.

7. The method according to claim 6, wherein the at least one thiuram sulfide compound has a structure of the formula:

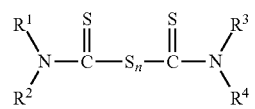

wherein n is an integer in the range from 1 to 6, and $R^1$, $R^2$, $R^3$ and $R^4$ are each independently selected from hydrogen and a monovalent organic group having from 1 to 20 carbon atoms, the monovalent organic group being an aliphatic or aromatic group, wherein the aliphatic or aromatic group is an alkyl group selected from methyl, ethyl, propyl, isopropyl, n-butyl, tert-butyl and isobutyl or an aryl or aralkyl group comprising phenyl, benzyl, xylyl, naphthyl or tolyl.

8. The method according to claim 7, wherein the thiuram sulfide compound is a tetraalkylthiuram mono- or disulfide, a tetraalkylarylthiuram mono- or disulfide, a tetraarylalkylthiuram mono- or disulfide, a tetraarylthiuram mono- or disulfide or a mixture or combination thereof.

9. The method according to claim 1, wherein the at least one thiocarbonyl-functional compound is present in step (b) in an amount of 0.05 to 3.0 wt.-%, based on the total amount of monomers subjected to the free-radical emulsion polymerization in step (a).

10. The method according to claim 1, wherein the monomer mixture comprises:
    20 to 90 wt. % of the at least one conjugated diene (i);
    10 to 50 wt. % of the at least one ethylenically unsaturated nitrile (ii);
    0 to 20 wt. % of the optional at least one ethylenically unsaturated acid (iii); and
    0 to 20 wt. % of the optional at least one further ethylenically unsaturated compound (iv), which is different from any of the compounds (i)-(iii);
wherein the weight percentages are based on the total amount of monomers.

11. The method according to claim 1, wherein the free-radical emulsion polymerization is conducted with monomer feed in batch, pseudobatch or continuous mode.

12. The method according to claim 1, wherein the monomers are polymerized in the presence of a seed latex, wherein the seed latex is prepared in-situ or is a pre-formed external seed latex.

13. The method according to claim 1, further comprising:
    removing residual monomers from an aqueous polymer dispersion after the free-radical emulsion polymerization step;
    adjusting a solids content of the aqueous polymer dispersion after the free-radical emulsion polymerization step to 8 to 60 wt.-%, based on the total weight of the aqueous polymer dispersion;
    or a combination thereof.

14. The method according to claim 1, wherein the one or more cross-linking agent in compounding step (c) is selected from:
   (a) sulphur;
   (b) at least one compound of a polyvalent metal;
   (c) at least one vulcanization accelerator;
   or a combination thereof.

15. A curable polymer latex composition obtained by the method according to claim 1.

16. A rubber article made from a curable polymer latex composition according to claim 15.

17. A method for making a rubber article according to claim 16, the method comprising:
   (a) providing a mold having a desired shape of the final article;
   (b) immersing the mold in a coagulant bath;
   (c) removing the mold from the coagulant bath and optionally drying it;
   (d) immersing the mold treated according to steps (b) and (c) in a curable polymer latex composition according to claim 15;
   (e) removing the mold from the curable polymer latex composition;
   (f) optionally immersing the latex coated mold in an aqueous cleaning bath and/or drying the latex coated mold;
   (g) heat treating the latex coated mold obtained from step (e) or (f) at a temperature in the range of 80° C. to 200° C. to form a rubber article on the mold; and
   (h) removing the formed article from the mold.

18. The method according to claim 17, wherein a removable liner that conforms to the shape of the mold is disposed on the mold prior to immersing the mold in the coagulant bath and the formed rubber article comprises the removable liner.

* * * * *